(12) United States Patent
Fowler et al.

(10) Patent No.: US 7,773,087 B2
(45) Date of Patent: Aug. 10, 2010

(54) DYNAMICALLY CONFIGURING AND SELECTING MULTIPLE RAY TRACING INTERSECTION METHODS

(75) Inventors: David Keith Fowler, Hastings, MN (US); Robert Allen Shearer, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 653 days.

(21) Appl. No.: 11/737,156

(22) Filed: Apr. 19, 2007

(65) Prior Publication Data
US 2008/0259075 A1 Oct. 23, 2008

(51) Int. Cl.
*G06T 15/00* (2006.01)
(52) U.S. Cl. .................. 345/426; 345/419; 345/423
(58) Field of Classification Search ............ 345/426, 345/427, 419, 423
See application file for complete search history.

(56) References Cited

U.S. PATENT DOCUMENTS 7,289,118 B2 * 10/2007 Schmittler et al. .......... 345/423
7,495,664 B2 * 2/2009 Keller et al. ............... 345/426

* cited by examiner

*Primary Examiner*—Phu Nguyen
(74) *Attorney, Agent, or Firm*—Patterson & Sheridan, LLP; James R. Nock

(57) ABSTRACT

Embodiments of the invention provide methods and apparatus to determine a coordinate system to use when traversing rays through a portion of a spatial index corresponding to a dynamic object which has a unique object coordinate system. An image processing system may take into consideration a number of factors including, but not limited to, a distance form a viewpoint to the dynamic object, a distance from the origin of the world coordinate system to the object coordinate system, a rate of traversal of the dynamic object, and a number of primitives which make up the object. These factors alone or together may indicate whether it is more efficient to perform ray intersection tests in an object coordinate system or in a world coordinate system. Embodiments of the invention may update a spatial index according to the selected coordinate system.

5 Claims, 31 Drawing Sheets

FIG. 8 (FRAME N)

FIG. 9 (FRAME N)

FIG. 10 (FRAME N+1)

FIG. 11 (FRAME N+1)

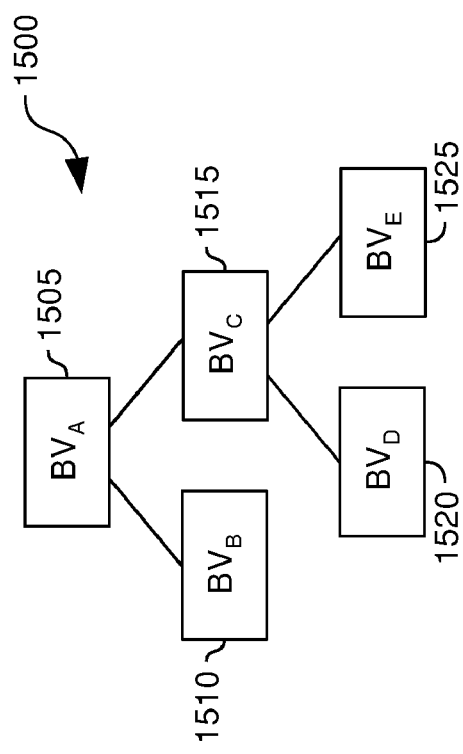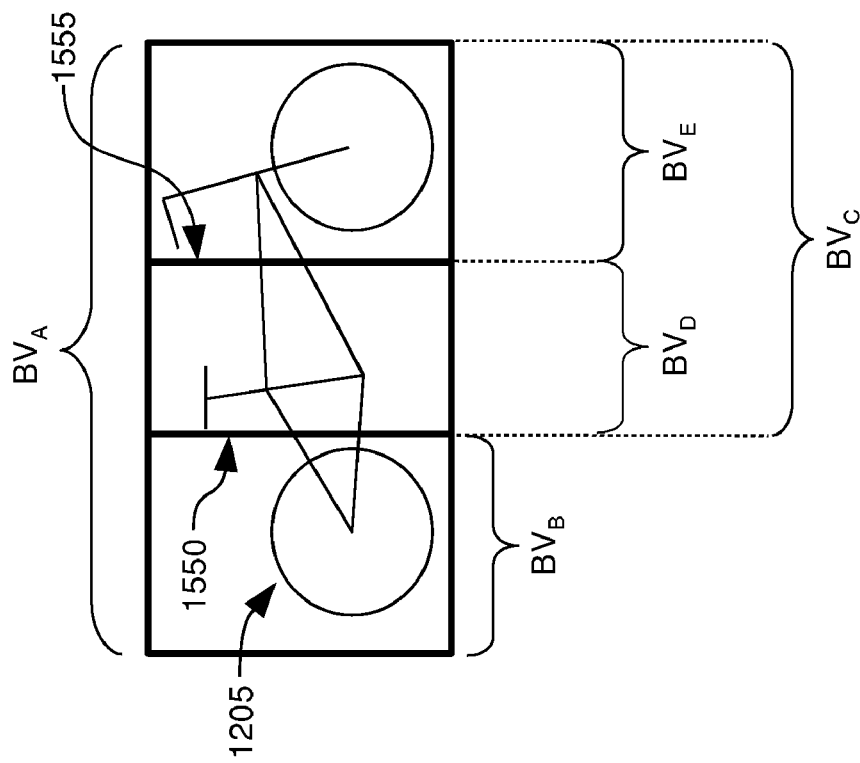
FIG. 15

DYNAMICALLY CONFIGURING AND SELECTING MULTIPLE RAY TRACING INTERSECTION METHODS

BACKGROUND OF THE INVENTION

1. Field of the Invention

Embodiments of the invention generally relate to the field of computer processing.

2. Description of the Related Art

The process of rendering two-dimensional images from three-dimensional scenes is commonly referred to as image processing. As the modern computer industry evolves image processing evolves as well. One particular goal in the evolution of image processing is to make two-dimensional simulations or renditions of three-dimensional scenes as realistic as possible. One limitation of rendering realistic images is that modern monitors display images through the use of pixels.

A pixel is the smallest area of space which can be illuminated on a monitor. Most modern computer monitors will use a combination of hundreds of thousands or millions of pixels to compose the entire display or rendered scene. The individual pixels are arranged in a grid pattern and collectively cover the entire viewing area of the monitor. Each individual pixel may be illuminated to render a final picture for viewing.

One technique for rendering a real world three-dimensional scene onto a two-dimensional monitor using pixels is called rasterization. Rasterization is the process of taking a two-dimensional image represented in vector format (mathematical representations of geometric objects within a scene) and converting the image into individual pixels for display on the monitor. Rasterization is effective at rendering graphics quickly and using relatively low amounts of computational power; however, rasterization suffers from some drawbacks. For example, rasterization often suffers from a lack of realism because it is not based on the physical properties of light, rather rasterization is based on the shape of three-dimensional geometric objects in a scene projected onto a two-dimensional plane. Furthermore, the computational power required to render a scene with rasterization scales directly with an increase in the complexity of the scene to be rendered. As image processing becomes more realistic, rendered scenes also become more complex. Therefore, rasterization suffers as image processing evolves, because rasterization scales directly with complexity.

Another technique for rendering a real world three-dimensional scene onto a two-dimensional monitor using pixels is called ray tracing. The ray tracing technique traces the propagation of imaginary rays, rays which behave similar to rays of light, into a three-dimensional scene which is to be rendered onto a computer screen. The rays originate from the eye(s) of a viewer sitting behind the computer screen and traverse through pixels, which make up the computer screen, towards the three-dimensional scene. Each traced ray proceeds into the scene and may intersect with objects within the scene. If a ray intersects an object within the scene, properties of the object and several other contributing factors are used to calculate the amount of color and light, or lack thereof, the ray is exposed to. These calculations are then used to determine the final color of the pixel through which the traced ray passed.

The process of tracing rays is carried out many times for a single scene. For example, a single ray may be traced for each pixel in the display. Once a sufficient number of rays have been traced to determine the color of all of the pixels which make up the two-dimensional display of the computer screen, the two-dimensional synthesis of the three-dimensional scene can be displayed on the computer screen to the viewer.

Ray tracing typically renders real world three-dimensional scenes with more realism than rasterization. This is partially due to the fact that ray tracing simulates how light travels and behaves in a real world environment, rather than simply projecting a three-dimensional shape onto a two-dimensional plane as is done with rasterization. Therefore, graphics rendered using ray tracing more accurately depict on a monitor what our eyes are accustomed to seeing in the real world.

Furthermore, ray tracing also handles increases in scene complexity better than rasterization as scenes become more complex. Ray tracing scales logarithmically with scene complexity. This is due to the fact that the same number of rays may be cast into a scene, even if the scene becomes more complex. Therefore, ray tracing does not suffer in terms of computational power requirements as scenes become more complex as rasterization does.

Image processing systems (such as ray-tracing image processing systems) may be used in combination with a physics engine to provide animation in a three-dimensional scene. The physics engine may simulate real world physical phenomena as applied to objects within the three-dimensional scene. For example, the physics engine may perform position updates for a moving object, and may perform collision detection tests to determine if the object collides with any other objects within the three dimensional scene.

One major drawback of game system using ray tracing image processing is the large number of calculations, and thus processing power, required to simulate the physics involved with a three-dimensional scene and to perform ray tracing to render the scene. This leads to problems when fast rendering is needed. For example, fast rendering may be necessary when a physics engine and an image processing system are to render graphics for animation in a game console. Due to the increased computational requirements for performing the physics calculations and to perform ray tracing it is difficult to render animation quickly enough to seem realistic (realistic animation is approximately twenty to twenty-four frames per second).

Therefore, there exists a need for more efficient techniques and devices to perform ray tracing and to perform physics simulation.

SUMMARY OF THE INVENTION

Embodiments of the present invention generally provide methods and apparatus for performing ray tracing.

According to one embodiment of the invention a method of performing ray tracing image processing for a three-dimensional scene is provided. The method generally comprising: providing a spatial index having a first portion and a second portion and having at least one branch from a node in the first portion to a node in the second portion, wherein nodes in the first portion correspond to bounding volumes which partition the three-dimensional scene with respect to a first coordinate system, and wherein nodes in the second portion correspond to bounding volumes which partition the three-dimensional scene with respect to a second coordinate system; issuing a ray into the three-dimensional scene; tracing the ray through the three-dimensional scene by taking branches to nodes corresponding to bounding volumes intersected by the ray until the at least one branch from a node in the first portion to a node in the second portion is reached; and selecting a coordinate system to use when tracing the ray through the portion of the spatial index which partitions the three-dimensional scene with respect to the second coordinate system.

According to another embodiment of the invention a method of generating a spatial index is provided. The method generally comprising: partitioning a three-dimensional scene by drawing splitting planes along axes in a world coordinate system and creating nodes in the spatial index which correspond to bounding volumes created by the splitting planes; partitioning a portion of the three-dimensional scene by drawing splitting planes along axes in a object coordinate system and creating nodes in the spatial index which correspond to bounding volumes created by the splitting planes, wherein the portion of the three-dimensional scene bounds one or more dynamic objects; creating a branch from a node corresponding to a bounding volume created by a splitting plane along an axis in the world coordinate system to a node corresponding to a bounding volume created by one or more splitting planes in the object coordinate system; and determining whether or not to convert coordinates of one or more primitives which make up an object from the object coordinate system to coordinates in the world coordinate system.

According to another embodiment of the invention a system is provided. The system generally comprising: a memory device; and a processing element configured to partition the three-dimensional scene by drawing splitting planes along axes in a world coordinate system; partition a portion of the three-dimensional scene by drawing splitting planes along axes in a object coordinate system, wherein the portion of the three-dimensional scene bounds one or more dynamic objects; create a branch in a spatial index from a bounding volume created by a splitting plane along an axis in the world coordinate system to a bounding volume created by one or more splitting planes in the object coordinate system; determine whether or not to convert coordinates of objects in the object coordinate system to coordinates in the world coordinate system; and store the spatial index having nodes corresponding to bounding volumes created by the splitting planes in the memory device.

BRIEF DESCRIPTION OF THE DRAWINGS

FIG. 15 illustrates an exemplary dynamic object surrounded by partitioning volumes and an associated spatial index, according to one embodiment of the invention.

DETAILED DESCRIPTION OF THE PREFERRED EMBODIMENTS

Figure 1:
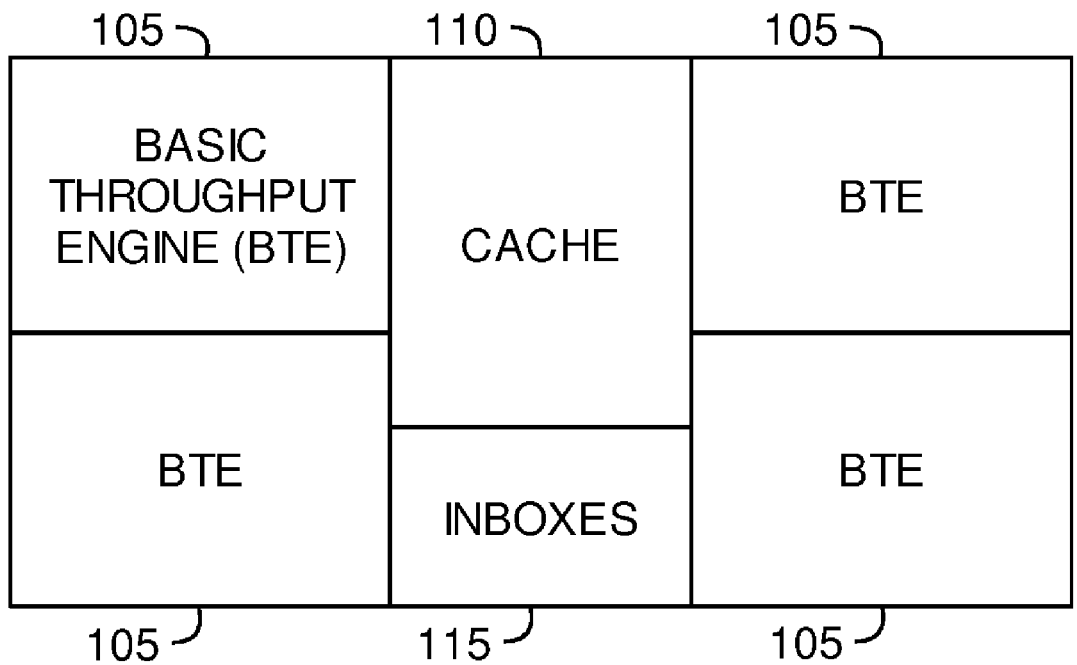
FIGS. 1 and 5 illustrate multiple core processing elements, according to embodiments of the invention.

Embodiments of the invention provide methods and articles of manufacture for selecting a coordinate system to use when tracing rays through a portion of a spatial index which corresponds to a dynamic object. According to embodiments of the invention, an image processing system may assess various factors associated with a dynamic object to determine if a world coordinate system or an object coordinate system would be more efficient to use when performing ray tracing through a portion of the spatial index which corresponds to the dynamic object. The factors may include, but are not limited to, the size of the dynamic object, the distance of the dynamic object from a viewpoint, the distance of the dynamic object from the origin of the world coordinate system, a rate of traversal of the dynamic object, and a number of primitives which make up the dynamic object.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable media. Illustrative computer-readable media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet and other networks. Such computer-readable media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

An Exemplary Processor Layout and Communications Network

FIG. 1 illustrates a multiple core processing element 100, according to one embodiment of the invention. The multiple core processing element 100 includes a plurality of basic throughput engines 105 (BTEs). A BTE 105 may contain a plurality of processing threads and a core cache (e.g., an L1 cache). The processing threads located within each BTE may have access to a shared multiple core processing element cache 110 (e.g., an L2 cache).

The BTEs 105 may also have access to a plurality of inboxes 115. The inboxes 115 may be memory mapped address space. The inboxes 115 may be mapped to the processing threads located within each of the BTEs 105. Each thread located within the BTEs may have a memory mapped inbox and access to all of the other memory mapped inboxes 115. The inboxes 115 make up a low latency and high bandwidth communications network used by the BTEs 105.

The BTEs may use the inboxes 115 as a network to communicate with each other and redistribute data processing work amongst the BTEs. For some embodiments, separate outboxes may be used in the communications network, for example, to receive the results of processing by BTEs 105. For other embodiments, inboxes 115 may also serve as outboxes, for example, with one BTE 105 writing the results of a processing function directly to the inbox of another BTE 105 that will use the results.

The aggregate performance of an image processing system may be tied to how well the BTEs can partition and redistribute work. The network of inboxes 115 may be used to collect and distribute work to other BTEs without corrupting the shared multiple core processing element cache 110 with BTE communication data packets that have no frame to frame coherency. An image processing system which can render many millions of triangles per frame may include many BTEs 105 connected in this manner.

In one embodiment of the invention, the threads of one BTE 105 may be assigned to a workload manager. An image processing system may use various software and hardware components to render a two-dimensional image from a three-dimensional scene. According to one embodiment of the invention, an image processing system may use a workload manager to traverse a spatial index with a ray issued by the image processing system. A spatial index, as described further below with regards to FIG. 4, may be implemented as a tree type data structure used to partition a relatively large three-dimensional scene into smaller bounding volumes. An image processing system using a ray tracing methodology for image processing may use a spatial index to quickly determine ray-bounding volume intersections. In one embodiment of the invention, the workload manager may perform ray-bounding volume intersection tests by using the spatial index.

In one embodiment of the invention, other threads of the multiple core processing element BTEs 105 on the multiple core processing element 100 may be vector throughput engines. After a workload manager determines a ray-bounding volume intersection, the workload manager may issue (send), via the inboxes 115, the ray to one of a plurality of vector throughput engines. The vector throughput engines may then determine if the ray intersects a primitive contained within the bounding volume. The vector throughput engines may also perform operations relating to determining the color of the pixel through which the ray passed.

Figure 2:
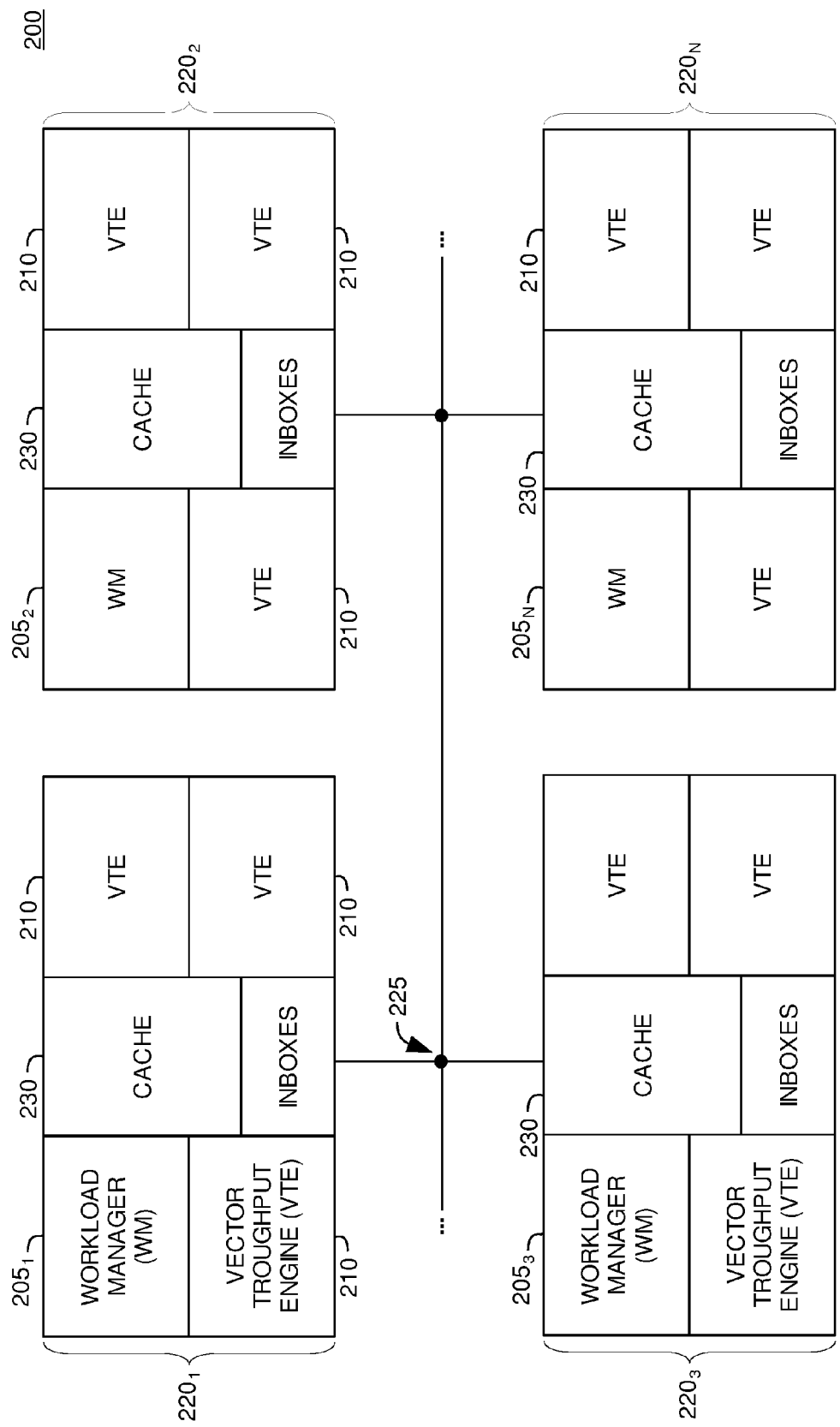
FIG. 2 illustrates a multiple core processing element network, according one embodiment of the invention.

FIG. 2 illustrates a network of multiple core processing elements 200, according to one embodiment of the invention. FIG. 2 also illustrates one embodiment of the invention where the threads of one of the BTEs of the multiple core processing element 100 is a workload manager 205. Each multiple core processing element $220_{1-N}$ in the network of multiple core processing elements 200 may contain one workload manager $205_{1-N}$, according to one embodiment of the invention. Each multiple core processing element $220_{1-N}$ in the network of multiple core processing elements 200 may also contain a plurality of vector throughput engines 210, according to one embodiment of the invention.

The workload managers $205_{1-N}$ may use a high speed bus 225 to communicate with other workload managers $205_{1-N}$ and/or vector throughput engines 210 of other multiple core processing elements $220_{1-N}$, according to one embodiment of the invention. Each of the vector throughput engines 210 may use the high speed bus 225 to communicate with other vector throughput engines 210 or the workload managers $205_{1-N}$. The workload manager processors 205 may use the high speed bus 225 to collect and distribute image processing related tasks to other workload managers $205_{1-N}$, and/or distribute tasks to other vector throughput engines 210. The use of a high speed bus 225 may allow the workload managers $205_{1-N}$ to communicate without affecting the caches 230 with data packets related to workload manager communications.

An Exemplary Three-Dimensional Scene

Figure 3:
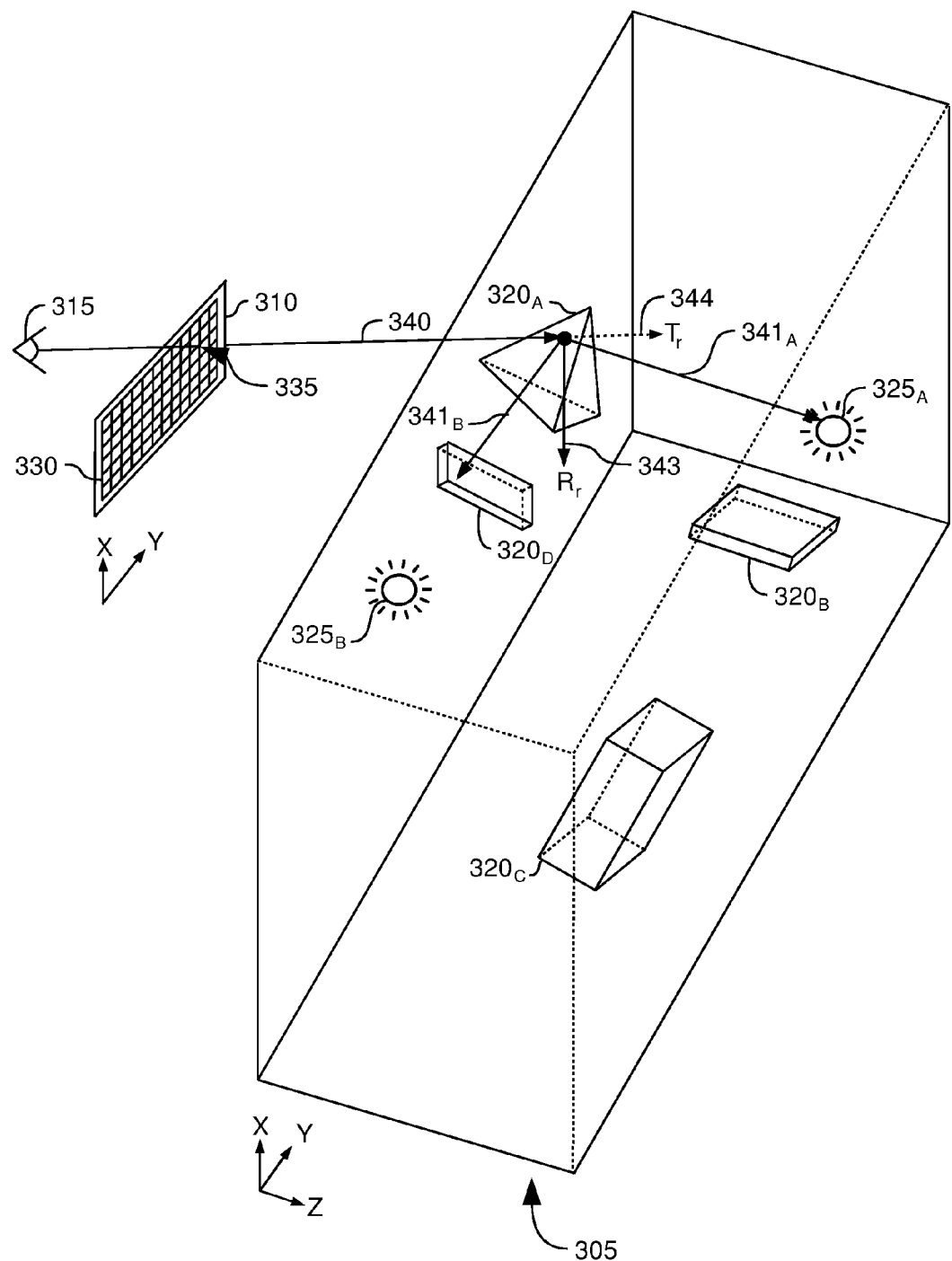
FIG. 3 is an exemplary three-dimensional scene to be rendered by an image processing system, according to one embodiment of the invention.

FIG. 3 is an exemplary three-dimensional scene 305 to be rendered by an image processing system. Within the three-dimensional scene 305 may be objects 320. The objects 320 in FIG. 3 are of different geometric shapes. Although only four objects 320 are illustrated in FIG. 3, the number of objects in a typical three-dimensional scene may be more or less. Commonly, three-dimensional scenes will have many more objects than illustrated in FIG. 3.

As can be seen in FIG. 3 the objects are of varying geometric shape and size. For example, one object in FIG. 3 is a pyramid $320_A$. Other objects in FIG. 3 are boxes $320_{B-D}$. In many modern image processing systems objects are often broken up into smaller geometric shapes (e.g., squares, circles, triangles, etc.). The larger objects are then represented by a number of the smaller simple geometric shapes. These smaller geometric shapes are often referred to as primitives.

Also illustrated in the scene 305 are light sources $325_{A-B}$. The light sources may illuminate the objects 320 located within the scene 305. Furthermore, depending on the location of the light sources 325 and the objects 320 within the scene 305, the light sources may cause shadows to be cast onto objects within the scene 305.

The three-dimensional scene 305 may be rendered into a two-dimensional picture by an image processing system. The image processing system may also cause the two-dimensional picture to be displayed on a monitor 310. The monitor 310 may use many pixels 330 of different colors to render the final two-dimensional picture.

One method used by image processing systems to render a three-dimensional scene 305 into a two-dimensional picture is called ray tracing. Ray tracing is accomplished by the image processing system "issuing" or "shooting" rays from the perspective of a viewer 315 into the three-dimensional scene 320. The rays have properties and behavior similar to light rays.

One ray 340, that originates at the position of the viewer 315 and traverses through the three-dimensional scene 305, can be seen in FIG. 3. As the ray 340 traverses from the viewer 315 to the three-dimensional scene 305, the ray 340 passes through a plane where the final two-dimensional picture will be rendered by the image processing system. In FIG. 3 this plane is represented by the monitor 310. The point the ray 340 passes through the plane, or monitor 310, is represented by a pixel 335.

As briefly discussed earlier, most image processing systems use a grid 330 of thousands (if not millions) of pixels to render the final scene on the monitor 310. The grid 330 may be referred to as a frame. Each individual pixel may display a different color to render the final composite two-dimensional picture on the monitor 310. An image processing system using a ray tracing image processing methodology to render a two-dimensional picture from a three-dimensional scene will calculate the colors that the issued ray or rays encounters in the three-dimensional scene. The image processing scene will then assign the colors encountered by the ray to the pixel through which the ray passed on its way from the viewer to the three-dimensional scene.

The number of rays issued per pixel may vary. Some pixels may have many rays issued for a particular scene to be rendered. In which case the final color of the pixel is determined by the each color contribution from all of the rays that were issued for the pixel. Other pixels may only have a single ray issued to determine the resulting color of the pixel in the two-dimensional picture. Some pixels may not have any rays issued by the image processing system, in which case their color may be determined, approximated or assigned by algorithms within the image processing system.

To determine the final color of the pixel 335 in the two-dimensional picture, the image processing system must determine if the ray 340 intersects an object within the scene. If the ray does not intersect an object within the scene it may be assigned a default background color (e.g., blue or black, representing the day or night sky). Conversely, as the ray 340 traverses through the three-dimensional scene 305 the ray 340 may strike objects. As the rays strike objects within the scene, the color of the object may be assigned to the pixel through which the ray passes. However, the color of the object must be determined before it is assigned to the pixel.

Many factors may contribute to the color of the object struck by the original ray 340. For example, light sources within the three-dimensional scene may illuminate the object. Furthermore, physical properties of the object may contribute to the color of the object. For example, if the object is reflective or transparent, other non-light source objects may then contribute to the color of the object.

In order to determine the effects from other objects within the three-dimensional scene, secondary rays may be issued from the point where the original ray 340 intersected the object. For example, shadow rays 341 may be issued to determine the contribution of light to the point where the original ray 340 intersected the object. If the object has translucent properties, the image processing system may issue a transmitted or a refracted ray 344 to determine what color or light to be transmitted through the body of the object. If the object has reflective properties, the image processing system may issue a reflected ray to determine what color or light is reflected onto the object 320.

One type of secondary ray may be a shadow ray. Each shadow ray may be traced from the point of intersection of the original ray and the object, to a light source within the three-dimensional scene 305. If the ray reaches the light source without encountering another object before the ray reaches the light source, then the light source will illuminate the object struck by the original ray at the point where the original ray struck the object.

For example, shadow ray $341_A$ may be issued from the point where original ray 340 intersected the object $320_A$, and may traverse in a direction towards the light source $325_A$. The shadow ray $341_A$ reaches the light source $325_A$ without encountering any other objects 320 within the scene 305. Therefore, the light source $325_A$ will illuminate the object $320_A$ at the point where the original ray 340 intersected the object $320_A$.

Other shadow rays may have their path between the point where the original ray struck the object and the light source blocked by another object within the three-dimensional scene. If the object obstructing the path between the point on the object the original ray struck and the light source is opaque, then the light source will not illuminate the object at the point where the original ray struck the object. Thus, the light source may not contribute to the color of the original ray and consequently neither to the color of the pixel to be rendered in the two-dimensional picture. However, if the object is translucent or transparent, then the light source may illuminate the object at the point where the original ray struck the object.

For example, shadow ray 341 B may be issued from the point where the original ray 340 intersected with the object $320_A$, and may traverse in a direction towards the light source $325_B$. In this example, the path of the shadow ray $341_B$ is blocked by an object $320_D$. If the object $320_D$ is opaque, then the light source $325_B$ will not illuminate the object $320_A$ at the point where the original ray 340 intersected the object $320_A$. However, if the object $320_D$ which the shadow ray is translucent or transparent the light source $325_B$ may illuminate the object $320_A$ at the point where the original ray 340 intersected the object $320_A$.

Another type of secondary ray is a transmitted or refracted ray. A refracted ray may be issued by the image processing system if the object with which the original ray intersected has transparent or translucent properties (e.g., glass). A refracted ray traverses through the object at an angle relative to the angle at which the original ray struck the object. For example, refracted ray 344 is seen traversing through the object $320_A$ which the original ray 340 intersected.

Another type of secondary ray is a transmitted or a refracted ray. If the object with which the original ray intersected has reflective properties (e.g. a metal finish), then a reflected ray will be issued by the image processing system to determine what color or light may be reflected onto the object. Reflected rays traverse away from the object at an angle relative to the angle at which the original ray intersected the object. For example, reflected ray 343 may be issued by the image processing system to determine what color or light may be reflected onto the object $320_A$ which the original ray 340 intersected.

The total contribution of color and light of all secondary rays (e.g., shadow rays, transmitted rays, reflected rays, etc.) will result in the final color of the pixel through which the original ray passed.

An Exemplary Kd-Tree

One problem encountered when performing ray tracing is determining quickly and efficiently if an issued ray intersects any objects within the scene to be rendered. One methodology known by those of ordinary skill in the art to make the ray intersection determination more efficient is to use a spatial index. A spatial index divides a three-dimensional scene or world into smaller volumes (smaller relative to the entire three-dimensional scene) which may or may not contain primitives. An image processing system can then use the known boundaries of these smaller volumes to determine if a ray may intersect primitives contained within the smaller volumes. If a ray does intersect a volume containing primitives, then a ray intersection test can be run using the trajectory of the ray against the known location and dimensions of the primitives contained within that volume. If a ray does not intersect a particular volume, then there is no need to run ray-primitive intersection tests against the primitives contained within that volume. Furthermore, if a ray intersects a bounding volume which does not contain primitives then there is no need to run ray-primitive intersections tests against that bounding volume. Thus, by reducing the number of ray-primitive intersection tests which may be necessary, the use of a spatial index greatly increases the performance of a ray tracing image processing system. Some examples of different spatial index acceleration data structures are octrees, k dimensional Trees (kd-Trees), and binary space partitioning trees (BSP trees). While several different spatial index structures exist, for ease of describing embodiments of the present invention, a kd-Tree will be used in the examples to follow. However, those skilled in the art will readily recognize that embodiments of the invention may be applied to any of the different types of spatial indexes.

A kd-Tree uses axis aligned bounding volumes to partition the entire scene or space into smaller volumes. That is, the kd-Tree may divide a three-dimensional space encompassed by a scene through the use of splitting planes which are parallel to known axes. The splitting planes partition a larger space into smaller bounding volumes. Together the smaller bounding volumes make up the entire space in the scene. The determination to partition (divide) a larger bounding volume into two smaller bounding volumes may be made by the image processing system through the use of a kd-tree construction algorithm.

One criterion for determining when to partition a bounding volume into smaller volumes may be the number of primitives contained within the bounding volume. That is, as long as a bounding volume contains more primitives than a predetermined threshold, the tree construction algorithm may continue to divide volumes by drawing more splitting planes. Another criterion for determining when to partition a bounding volume into smaller volumes may be the amount of space contained within the bounding volume. Furthermore, a decision to continue partitioning the bounding volume may also be based on how many primitives may be intersected by the plane which creates the bounding volume.

The partitioning of the scene may be represented by a binary tree structure made up of nodes, branches and leaves. Each internal node within the tree may represent a relatively large bounding volume, while the node may contain branches to sub-nodes which may represent two relatively smaller partitioned volumes resulting after a partitioning of the relatively large bounding volume by a splitting plane. In an axis-aligned kd-Tree, each internal node may contain only two branches to other nodes. The internal node may contain branches (i.e., pointers) to one or two leaf nodes. A leaf node is a node which is not further sub-divided into smaller volumes and contains pointers to primitives. An internal node may also contain branches to other internal nodes which are further sub-divided. An internal node may also contain the information needed to determine along what axis the splitting plane was drawn and where along the axis the splitting plane was drawn.

Exemplary Bounding Volumes

Figure 4A:
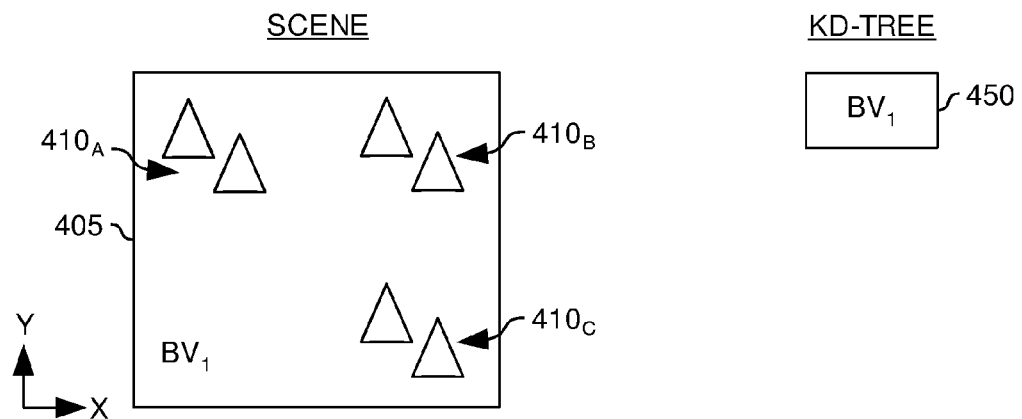
FIGS. 4A-4C illustrate a two-dimensional space to be rendered by an image processing system and a corresponding spatial index created by an image processing system, according to embodiments of the invention.
Figure 4B:
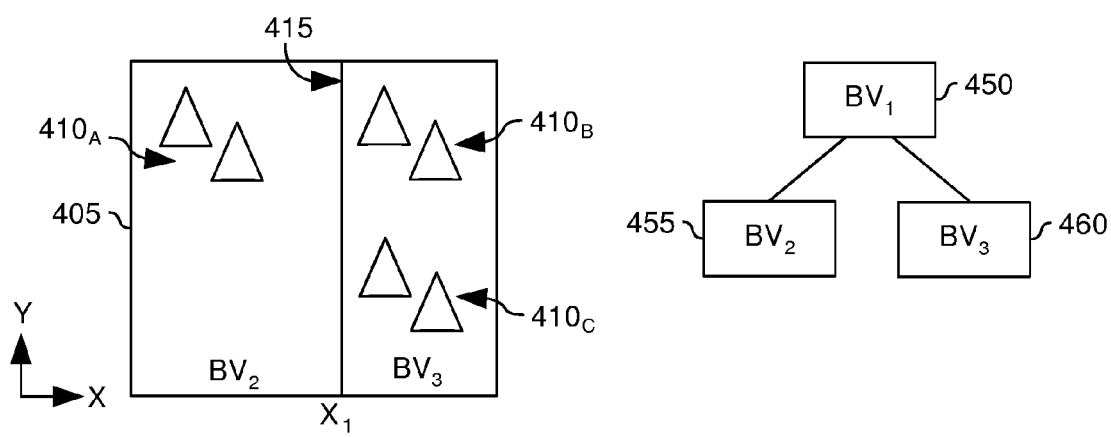
Figure 4C:
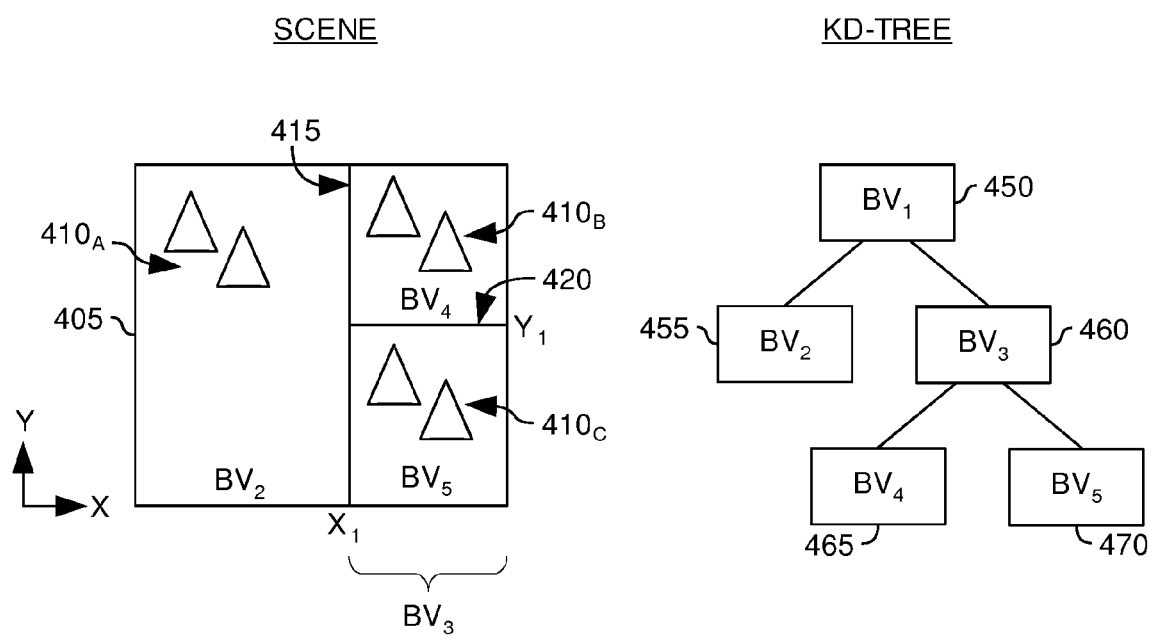

FIGS. 4A-4C illustrate a two-dimensional space to be rendered by an image processing system and a corresponding kd-tree. For simplicity, a two-dimensional scene is used to illustrate the building of a kd-Tree, however kd-Trees may also be used to represent three-dimensional scenes. In the two-dimensional illustration of FIGS. 4A-4C splitting lines are illustrated instead of splitting planes, and bounding areas are illustrated instead of bounding volumes as would be used in a three-dimensional structure. However, one skilled in the art will quickly recognize that the concepts may easily be applied to a three-dimensional scene containing objects.

FIG. 4A illustrates a two-dimensional scene 405 containing primitives 410 to be rendered in the final picture to be displayed on a monitor 310. The largest volume which represents the entire volume of the scene is encompassed by bounding volume 1 ($BV_1$). In the corresponding kd-Tree this may be represented by the top level node 450, also known as the root or world node. In one embodiment of an image processing system, an image processing system may continue to partition bounding volumes into smaller bounding volumes when the bounding volume contains, for example, more than two primitives. As noted earlier the decision to continue partitioning a bounding volume into smaller bounding volumes may be based on many factors, however for ease of explanation in this example the decision to continue partitioning a bounding volume is based only on the number of primitives. As can be seen in FIG. 4A, $BV_1$ contains six primitives, therefore kd-Tree construction algorithm may partition $BV_1$ into smaller bounding volumes.

FIG. 4B illustrates the same two-dimensional scene 405 as illustrated in FIG. 4A. However, in FIG. 4B the tree construction algorithm has partitioned $BV_1$ into two smaller bounding volumes $BV_2$ and $BV_3$. The partitioning of $BV_1$, was accomplished, by drawing a splitting plane $SP_1$ 415 along the x-axis at point $x_1$. This partitioning of $BV_1$ is also reflected in the kd-Tree as the two nodes 455 and 460, corresponding to $BV_2$ and $BV_3$ respectively, under the internal or parent node $BV_1$ 450. The internal node representing $BV_1$ may now store information such as, but not limited to, pointers to the two nodes beneath $BV_1$ (e.g., $BV_2$ and $BV_3$), along which axis the splitting plane was drawn (e.g., x-axis), and where along the axis the splitting plane was drawn (e.g., at point $x_1$).

The kd-Tree construction algorithm may continue to partition bounding volume $BV_3$ because it contains more than the predetermined threshold of primitives (e.g., more than two primitives). However, the kd-Tree construction algorithm may not continue to partition bounding volume $BV_2$, because bounding volume $BV_2$ contains less than or equal to the number of primitives (e.g., only two primitives 410A). Nodes which are not partitioned or sub-divided any further, such as $BV_2$, are referred to as leaf nodes.

FIG. 4C illustrates the same two-dimensional scene 405 as illustrated in FIG. 4B. However, in FIG. 4C the kd-Tree construction algorithm has partitioned $BV_3$ into two smaller bounding volumes $BV_4$ and $BV_5$. The kd-construction algorithm has partitioned $BV_3$ using a partitioning plane along the y-axis at point $y_1$. Since $BV_3$ has been partitioned into two sub-nodes it may now be referred to as an internal node. The partitioning of $BV_3$ is also reflected in the kd-Tree as the two leaf nodes 465 and 470, corresponding to $BV_4$ and $BV_5$ respectively. $BV_4$ and $BV_5$ are leaf nodes because the volumes they represent are not further divided into smaller bounding volumes. The two leaf nodes, $BV_4$ and $BV_5$, are located under the internal node $BV_3$ which represents the bounding volume which was partitioned in the kd-Tree.

The internal node representing $BV_3$ may store information such as, but not limited to, pointers to the two leaf nodes (i.e., $BV_4$ and $BV_5$), along which axis the splitting plane was drawn (i.e., y-axis), and where along the axis the splitting plane was drawn (i.e., at point $y_1$).

The kd-Tree construction algorithm may now stop partitioning the bounding volumes because all bounding volumes located within the scene contain less than or equal to the maximum predetermined number of primitives which may be enclosed within a bounding volume. The leaf nodes may contain pointers to the primitives which are enclosed within the bounding volumes each leaf represents. For example, leaf node $BV_2$ may contain pointers to primitives 410A, leaf node $BV_4$ may contain pointers to primitives $410_B$, and leaf node $BV_5$ may contain pointers to primitives $410_C$.

A ray tracing image processing system may use the workload manager 205 to traverse the spatial index (kd-Tree). Traversing the kd-Tree may include selecting a branch to a node on a lower level (sub-node) of the kd-Tree to take or proceed to in order to determine if the ray intersects any primitives contained within the sub-node. A workload manager 205 may use the coordinates and trajectory of an issued ray to traverse or navigate through the kd-Tree. By executing ray-bounding volume intersection tests, the workload manager 205 may determine if the ray intersects a plane of the bounding volumes represented by nodes within the kd-Tree structure. If the ray intersects a bounding volume which contains only primitives (i.e., a leaf node), then the workload manager 205 may send the ray and associated information to a vector throughput engine 210 for ray-primitive intersection tests. A ray-primitive intersection test may be executed to determine if the ray intersects the primitives within the bounding volume. This methodology results in fewer ray-primitive intersection tests needed to determine if a ray intersects an object within the scene, in comparison to running ray-primitive intersection tests for a ray against each primitive contained within the scene.

The resulting kd-Tree structure, or other spatial index structure, may be stored in a processor cache 230. The kd-Tree and the size of corresponding data which comprises the kd-Tree may be optimized for storage in a processor cache 230. The storage of the kd-Tree in a processor cache 230 may allow a workload manager 205 to traverse the kd-Tree with a ray that has been issued by the image processing system without having to retrieve the kd-Tree from memory every time a ray is issued by the image processing system.

Physics Engine

A physics engine is an application which may simulate real world physical phenomena as applied to objects within a three-dimensional scene. A physics engine may be used to simulate and predict the effects of physical phenomena on a frame to frame basis. For example, the physics engine may perform position updates for an object if the object is moving, and may perform collision detection tests to determine if an object collides with any other objects within the three-dimensional scene.

An image processing system may be used in conjunction with a physics engine to render the simulated physical interactions and objects within a three-dimensional scene to a two-dimensional screen. For example, a video game engine may use both a physics engine and an image processing system to simulate object movements or interactions within a three-dimensional scene and to display the objects and the environment on a monitor.

Figure 5:
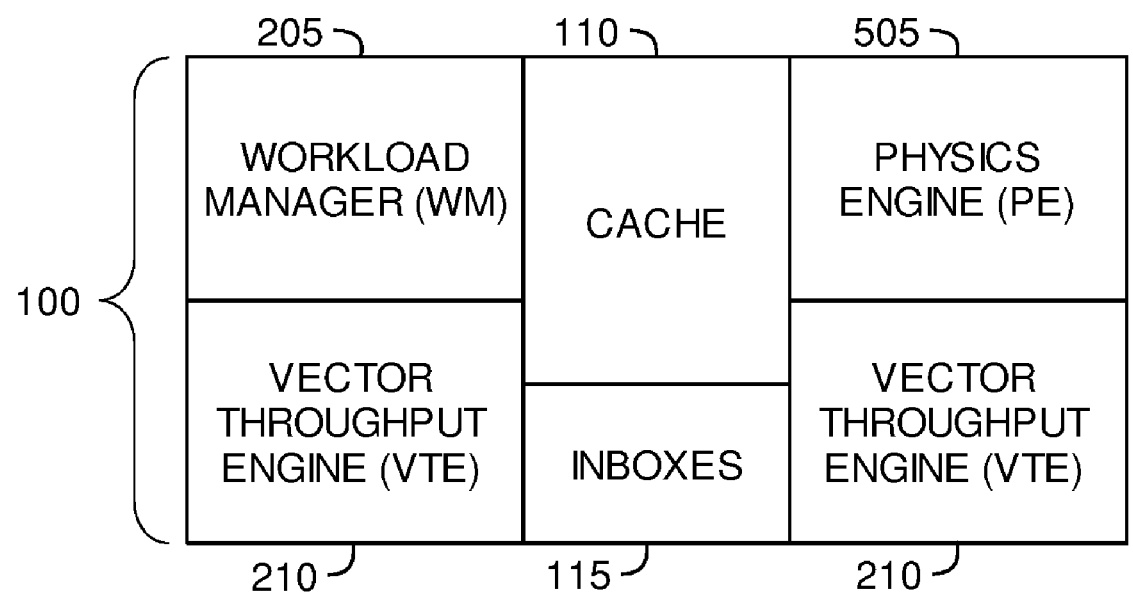

According to one embodiment of the invention, a physics engine may use multiple threads on a multiple core processing element to perform physics related calculations. For example, FIG. 5 illustrates a multiple core processing element 100 wherein the threads of one of the cores are allocated to a physics engine 505. Other cores within the multiple-core processing element may perform image processing related tasks, according to embodiments of the invention. For example, one core within the multiple-core processing element 100 may be allocated to a workload manager 205 and other cores within the multiple-core processing element 100 may be allocated to vector throughput engines 210, according to one embodiment of the invention.

The multiple-core processing element 100 may have a memory cache 110 shared between all of the cores located on the multiple-core processing element 100. Furthermore, each core may have its own cache (e.g., an L1 cache). The multiple-core processing element 100 may also contain inboxes 115. The inboxes 115 may be memory mapped address space used by the cores as a communications network.

Figure 6:
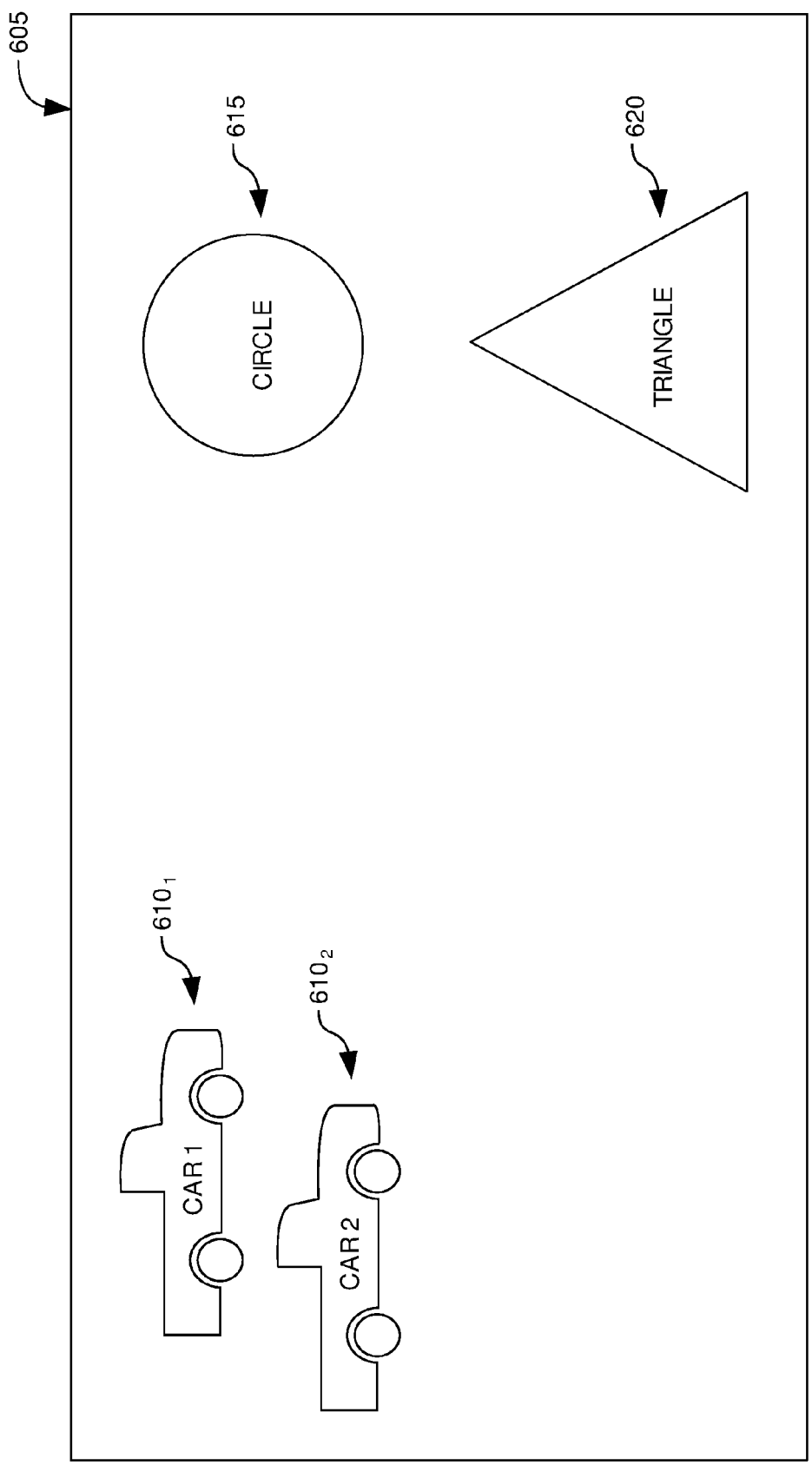
FIG. 6 illustrates an exemplary three-dimensional scene to be rendered by an image processing system, according to embodiments of the invention.

FIG. 6 illustrates an exemplary three-dimensional scene 605. The three-dimensional scene 605 contains several objects including a first car object $610_1$, a second car object $610_2$, a circle object 615, and a triangle object 620. A physics engine may simulate real world physical phenomena as applied to the objects (i.e., $610_1$, $610_2$, 615, and 620) within the three-dimensional scene 605 illustrated in FIG. 6.

One structure a physics engine may use to keep track of objects in a three-dimensional scene is a scene graph or a scene index. On a frame to frame basis, the physics engine 505 may use a scene graph to store and access information which defines the objects located within the three-dimensional scene. The scene graph may use a hierarchical structure (e.g., a tree) to index or order the objects.

Figure 7:
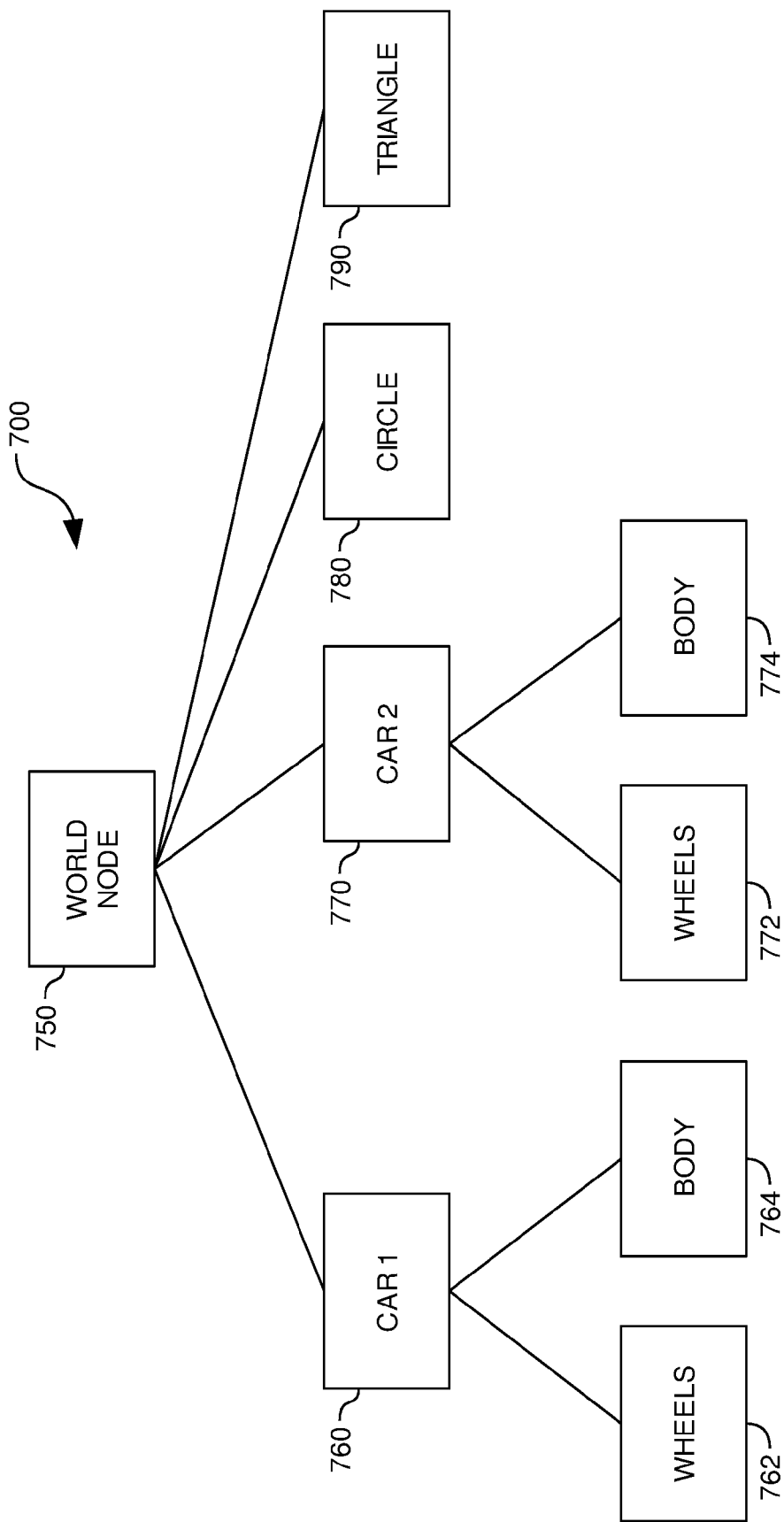
FIG. 7 illustrates a scene graph, according to one embodiment of the invention.

For example, FIG. 7 illustrates an exemplary scene graph 700, according to one embodiment of the invention. As illustrated, the scene graph 700 may contain a world node 750 which represents the entire three-dimensional scene 605. The world node 750 may branch to nodes which represent objects within the three-dimensional scene. For example, the world node 750 may branch to four object nodes. Each of the four object nodes in the scene graph 700 may correspond to one of the four objects within the three-dimensional scene 605 of FIG. 6 (i.e., a node 760 corresponding to the first car object $610_1$, a node 770 corresponding to the second car object $610_2$, a node 780 corresponding to the circle object 615, and a node 790 corresponding to the triangle object 620).

The object nodes may branch to other nodes on a lower level of the scene graph 700. The branched to nodes may represent objects which make up part of the larger object or may be nodes which define the object (position, color, mass, etc.). For example, the node 760 representing the first car object branches to a node 762 representing a wheels object and to a node 764 representing a body object. Thus, the scene graph is a hierarchical acceleration data structure based on objects located within a three-dimensional scene.

The scene graph may be stored, for example, in a memory cache (e.g., cache 110) of a processing element to enable the physics engine 505 fast access to the information contained within the scene graph 700. Because a scene graph 700 is an object oriented structure and a physics engine performs calculations on an object by object basis, a scene graph is an efficient structure to use with a physics engine.

In contrast to a physics engine using a scene graph, an image processing system may use a spatial index (e.g., a kd-tree) to render a two-dimensional image from a three-dimensional scene. As described previously with respect to FIG. 4, a spatial index partitions a three-dimensional scene based on a spatial or bounding volume hierarchy. Because a scene graph is a spatial based structure and a ray tracing image processing system performs calculations based on where a ray traverses through a three-dimensional scene, a spatial index is an efficient structure to use with a ray tracing image processing system.

Figure 8:
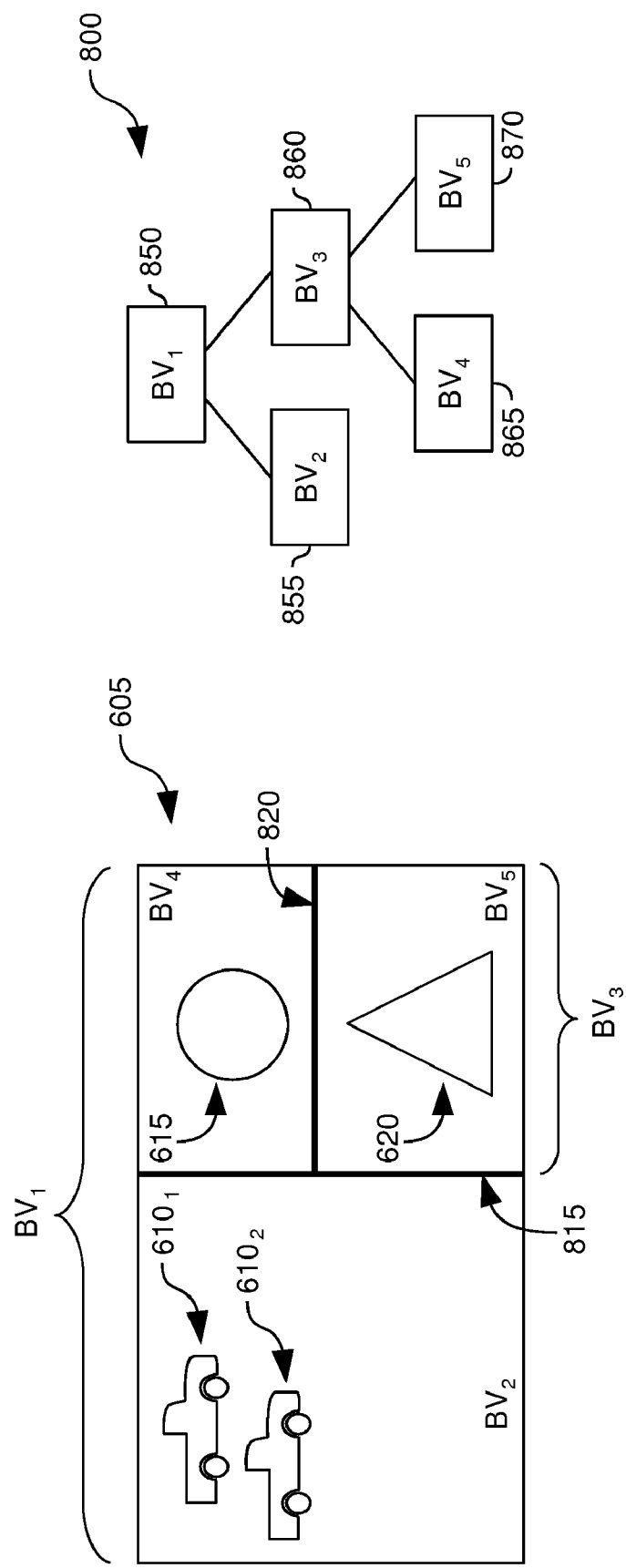
FIG. 8 illustrates a three-dimensional scene to be rendered by an image processing system and a corresponding spatial index, according to one embodiment of the invention.

FIG. 8 illustrates a spatial index 800 which may be used by an image processing system to render a two-dimensional image from the three-dimensional scene 605. The three-dimensional scene 605 illustrated in FIG. 7 may be the same three-dimensional scene 605 to which the scene graph 700 corresponds.

The spatial index 800 may contain a world node 850 which defines bounding volume 1 ($BV_1$) which encompasses the entire volume of the three-dimensional scene 605. $BV_1$ may be partitioned into two smaller bounding volumes $BV_2$ and $BV_3$ through the use of a splitting plane 815. The partitioning of $BV_1$ is reflected in the kd-Tree as the two nodes 855 and 860, corresponding to $BV_2$ and $BV_3$ respectively, under the internal or parent node $BV_1$ 850. The internal node 850 representing $BV_1$ may now store information such as, but not limited to, pointers to the two nodes beneath $BV_1$ (e.g., $BV_2$ and $BV_3$), along which axis the splitting plane 815 was drawn (e.g., x-axis), and where along the axis the splitting plane 815 was drawn.

Furthermore, $BV_3$ may be partitioned into two smaller bounding volumes $BV_4$ and $BV_5$. Two leaf nodes 865 and 870 in the spatial index may correspond to the bounding volumes $BV_4$ and $BV_5$, respectively.

The leaf nodes (i.e., 855, 865, and 870) of the spatial index 800 may include information which defines the corresponding bounding volumes within the three-dimensional scene (i.e., $BV_2$, $BV_4$ and $BV_5$) and may contain pointers to primitives located within the corresponding bounding volumes.

On a frame to frame basis, objects within the three-dimensional scene may move or change shape. In response to changes in position or shape of objects, the spatial index may need to be updated such that the spatial index accurately reflects the location of objects or primitives within the three-dimensional scene. Similarly, a scene graph used by the physics engine 505 may also need to be updated to accurately reflect the new position or shape of objects within the three-dimensional scene. Thus, in response to objects moving or changing shape, two data structures may need to be updated on a frame to frame basis.

The image processing system may store the spatial index 800, for example, in the memory cache (e.g., cache 110). As previously described, a scene graph may also be stored in the memory cache 110 of the multiple core processing element 100. However, in some circumstances the memory cache 110 may not have enough storage space available to efficiently store both the scene graph 700 and the spatial index 800.

Integrated Acceleration Data Structure for Physics and Ray Tracing Image Processing According to embodiments of the invention, an integrated acceleration data structure may be used by both the physics engine 505 and the image processing system in order to perform both physics calculations and to perform ray tracing respectively. A single integrated acceleration data structure may perform the functions of a spatial index and may simultaneously perform the functions of a scene graph. By using a single integrated acceleration data structure rather than using two data structures, the amount of space required to store information sufficient for both the physics engine 505 and the image processing system to perform their respective tasks may be reduced. Furthermore, in contrast to the need to update two data structures in response to movements of objects within the three-dimensional scene, the image processing system may only need to update a single data structure (i.e., the integrated acceleration data structure). The processing time gained by only updating a single data structure may reduce the time necessary to perform physics engine tasks and image processing tasks, thus increasing overall system performance.

According to one embodiment of the invention, an integrated spatial index may be formed by initially partitioning a three-dimensional scene into bounding volumes that encompass objects within the three-dimensional scene. Accordingly, the initial or top portions of the integrated acceleration data structure are formed based on a spatial or bounding volume hierarchy. Once a bounding volume encompasses an object within the three-dimensional scene, an object oriented hierarchy may be used to represent the object within the bounding volume. Thus, the lower portions of the integrated acceleration data structure are formed based on an object oriented hierarchy. Consequently, the initial or top portions of the integrated acceleration data structure may resemble a spatial index 800 (e.g., a kd-tree) and the lower portions of the integrated acceleration data structure may resemble a scene graph 700.

Figure 9:
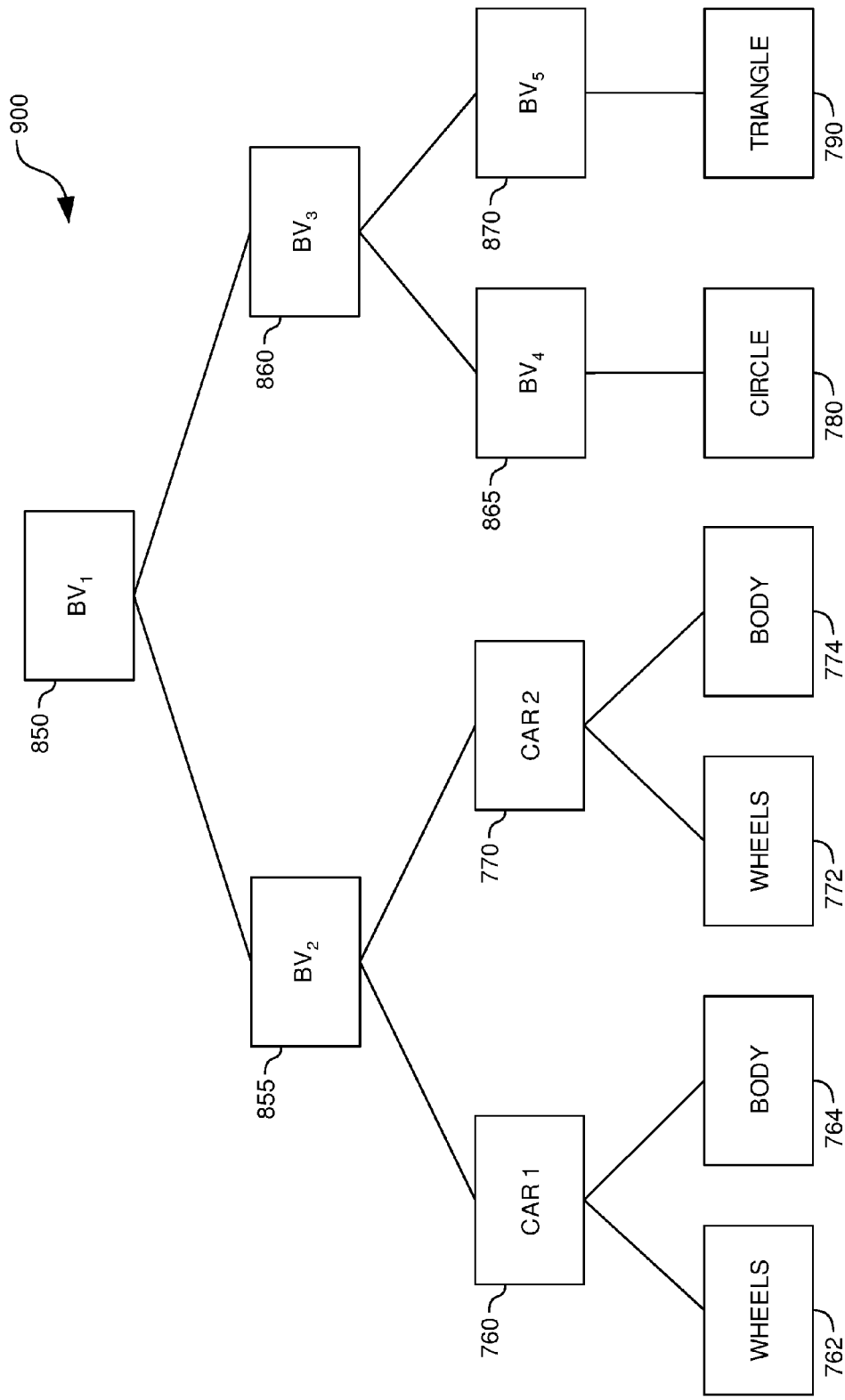
FIGS. 9 and 11 illustrate integrated acceleration data structures, according to embodiments of the invention.

FIG. 9 illustrates an integrated acceleration data structure 900, according to one embodiment of the invention. The exemplary integrated acceleration data structure 900 corresponds to the three-dimensional scene 605 illustrated in FIG. 6.

The integrated acceleration data structure 900 illustrated in FIG. 9 has an initial structure defined by the spatial index 800 which was described with reference to FIG. 8, having a world node and smaller bounding volumes.

According to embodiments of the invention, in order to form an integrated acceleration data structure 900, the nodes which define bounding volumes within the three-dimensional scene may branch to (i.e., contain information which points to) nodes which define objects located within bounding volumes. Thus, in contrast to a spatial index where the final spatially oriented nodes (i.e., the leaf nodes) only point to primitives, the final spatially oriented nodes in an integrated acceleration data structure 900 may branch to object nodes which define objects.

For example, as illustrated in FIG. 9, node 855 corresponding to $BV_2$ may branch to object nodes 760 and 770 (representing the first car object $610_1$ and the second car object $610_2$) from the scene graph 700. The object nodes 760 and 770 are branched to from the node 855 corresponding to $BV_2$ because the first car object $610_1$ and the second car object $610_2$ are both located within bounding volume $BV_2$ as illustrated in FIG. 8.

Similar to the scene graph 700, the nodes branched to from each object node in the integrated acceleration data structure 900 may continue to define properties of the objects or portions of the object which collectively construct the object. For example, each car object node branches to a wheel object node (e.g., 762 or 772) and a body object node (e.g., 764 or 774), which further define each car object.

Also illustrated in the integrated acceleration data structure 900 are nodes corresponding to the remaining objects in the three-dimensional scene 605. For example, the circle object node 780 is branched to from the node 865 defining the bounding volume $BV_4$. The circle object node 780 may be branched to from the node 865 defining bounding volume $BV_4$, because the circle object 615 is located within bounding volume $BV_4$. Furthermore, the triangle object node 790 is branched to from the node 870 defining the bounding volume $BV_5$. The triangle object node 790 may be branched to from the node 865 defining bounding volume $BV_5$, because the triangle object 620 is located within bounding volume $BV_5$.

In order for a physics engine 505 or an image processing system to determine if a node corresponds to an object or to a bounding volume, each node within the integrated acceleration data structure may contain an object node flag or bit. The object node bit may be a single bit located within the memory space which defines a node within the integrated acceleration data structure 900. According to one embodiment of the invention, if a node within the spatial index is an object node, the object node bit may be asserted. Furthermore, if a node within the spatial index is not an object node, the object node bit may not be asserted. Thus, a physics engine 505 performing physics calculations or the image processing system performing ray tracing may be able to quickly determine if the node is an object node or a node defining a bounding volume by determining if the object node bit is asserted.

Integrated Acceleration Data Structure Usage

According to embodiments of the invention, an image processing system may perform ray tracing with an integrated acceleration data structure. As described with regards to FIG. 4, when using a spatial index (e.g., a kd-tree) the image processing system may use a workload manager 205 to issue rays into the three-dimensional scene and to trace the rays (based on the trajectory of the ray) through the three-dimensional scene. The workload manager 205 may trace rays through the three-dimensional scene using the spatial index by performing ray-bounding volume intersection tests against the bounding volumes defined by the nodes in the spatial index. The workload manager 205 may take branches to nodes based on which bounding volumes are intersected by the ray. When the workload manager 205 traverses to a certain point within the spatial index (e.g., a leaf node defining a bounding volume), the workload manager 205 may send the ray to a vector throughput engine 210 to determine if the ray intersects any primitives (e.g., contained within the bounding volume defined by the leaf node). If the ray intersects a primitive, the vector throughput engine 210 may consequently determine the color contribution to the two-dimensional image based on an intersected primitive. If not, the workload manager 205 may traverse the kd-tree again to determine if the ray intersects any other primitives located within the three-dimensional scene.

The image processing system may use an integrated acceleration data structure 900 to perform ray tracing, in a manner similar to using a spatial index. The image processing system may issue rays into the three-dimensional scene and trace rays through the three-dimensional scene using the integrated acceleration data structure 900 by performing ray-bounding volume intersection tests against the bounding volumes defined by the spatially oriented nodes in the spatial index. The workload manager 205 may take branches to nodes based on which bounding volumes are intersected by the ray. When the workload manager 205 traverses to a certain point within the integrated acceleration data structure (e.g., an object node), the workload manager 205 may send the ray to a vector throughput engine 210 to determine if the ray intersects any primitives. However, according to other embodiments of the invention, the workload manager 205 may determine if the ray intersects any primitives.

Furthermore, the physics engine 505 may perform physics related tasks using the integrated acceleration data structure. When using a scene graph the physics engine may determine the effect of physical phenomena on objects within the three-dimensional scene 605 on an object-by-object basis. The physics engine 505 may perform the same physics calculations with an integrated acceleration structure on an object-by-object basis by searching for object nodes within the integrated acceleration data structure 900. The physics engine 505 may determine if a node is an object node by checking the object node bit in the information which defines the node. Once a node is found within the integrated acceleration data structure that has its object node bit asserted, the physics engine may perform physics calculations on the object.

Thus, by forming a data structure which uses both a spatial (or bounding volume) oriented hierarchy and an object oriented hierarchy, a single data structure may be formed which may be used by both the image processing system and the physics engine 505.

Although in the preceding example the integrated acceleration data structure 900 has been described wherein each entire object may be contained within a single bounding volume, in some circumstances portions of objects may be located within two separate bounding volumes. That is, objects within the three-dimensional scene may be divided by a splitting plane which creates a boundary between bounding volumes. Consequently, portions of an object may be located within separate bounding volumes created by the splitting plane.

In this scenario, according to one embodiment of the invention, the information defining an object node may contain a bit location which indicates that information which defines the entire object is located within a plurality of object nodes within the integrated acceleration data structure. The bit within the information defining an object node may be asserted to indicate that information which defines the object may be located within a plurality of object nodes of the integrated acceleration data structure, and de-asserted to indicate that the information which defines the object is located entirely within the current object node.

Furthermore, if an object node which contained only a portion of an object was created when constructing the integrated acceleration data structure, a pointer to another object node (or nodes) which contain the remaining information which defines the object may be stored in each object node (which contains a portion of the object, according to one embodiment of the invention). Thus, the physics engine may quickly find the other object node(s) within the integrated acceleration data structure. By using a bit within the information defining an object node to indicate whether or not the object is defined within a plurality of object nodes, the likelihood may be reduced that a physics engine 505 performing position updates or collision detection tests fails to perform tests against all of the portions of an object located within the three-dimensional scene.

Figure 10:
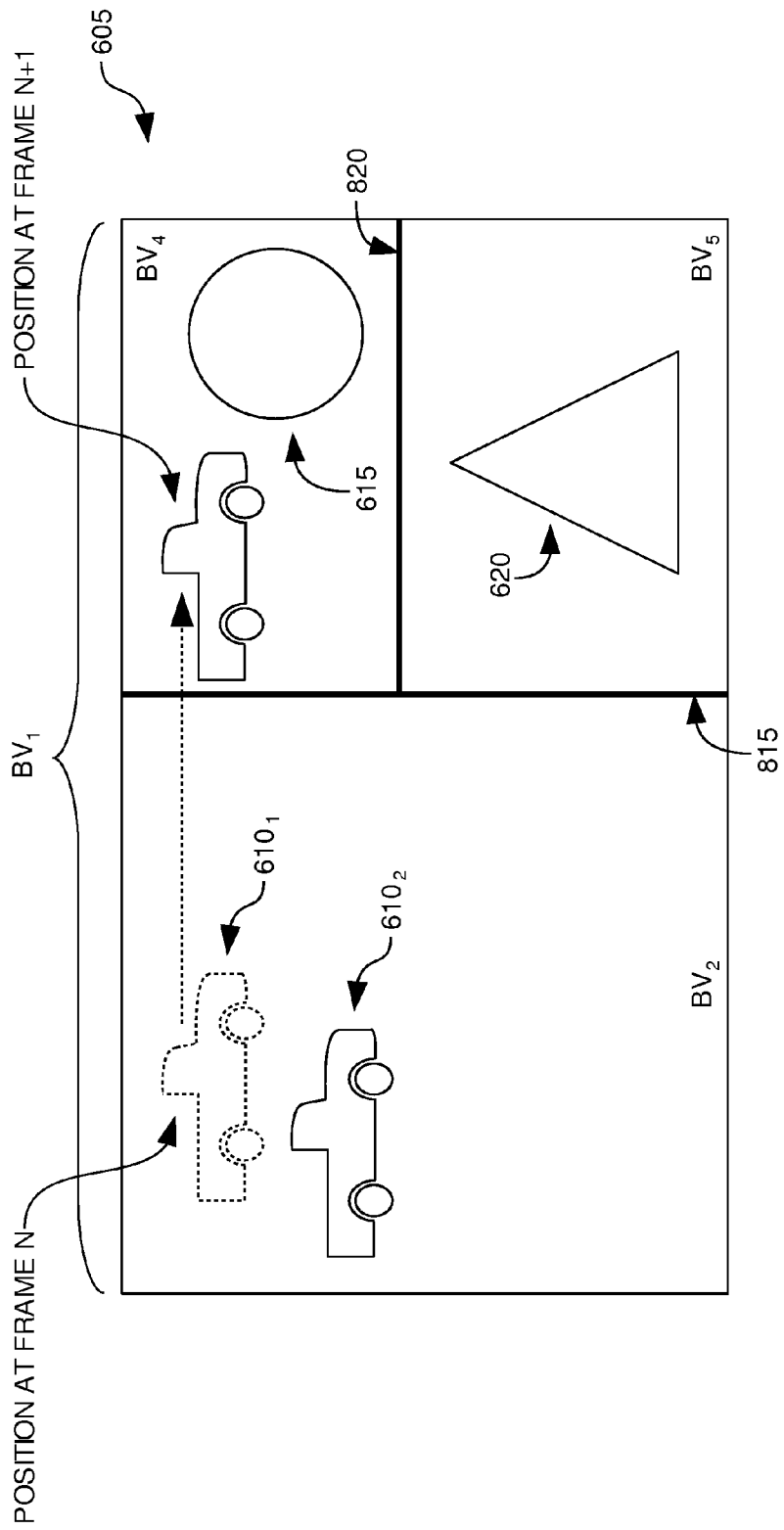
FIG. 10 illustrates an exemplary three-dimensional scene to be rendered by an image processing system, according to one embodiment of the invention.

Updating an Integrated Acceleration Data Structure in Response to Object Movements According to embodiments of the invention, an integrated acceleration data structure 900 may be used to maintain a record of movements or changes to objects located within the three-dimensional scene. For example, in contrast to the three-dimensional scene 605 illustrated in FIG. 6, FIG. 10 illustrates a three-dimensional scene 605B where the first car object $610_1$ has moved from a first position in the frame N of the three-dimensional scene 605 to a second position in frame N+1 of the three-dimensional scene 605 (as illustrated by the dashed lines in FIG. 10).

In response to the movement of the first car object $610_1$, hardware or software components within the image processing system may update the integrated acceleration data structure 900.

According to one embodiment of the invention, the physics engine 505 may update the integrated acceleration data structure 900 to reflect change in position or shape of objects within the three-dimensional scene 605. The physics engine 505 may perform position updates and collision detection tests for all of the objects located within the three-dimensional scene. For example, the object node 760 corresponding to the first car object 610, may be updated to reflect the new position of the first car object $610_1$. After performing the tests, the physics engine 505 may record the results of the calculations (e.g., the new positions of the objects) in the integrated acceleration data structure 900.

Furthermore, if an object has moved such that the branches to nodes within the integrated acceleration data structure need to be updated, the physics engine 505 may update the branches as well. For example, the movement of the first car object $610_1$ from its position illustrated in frame N of the three-dimensional scene 605 (as seen in FIG. 7) to its position illustrated in frame N+1 of the three-dimensional scene (as seen in FIG. 10) may require that the physics engine 505 update the position of the first car object $610_1$ in the integrated acceleration data structure 900. Furthermore, as illustrated in FIG. 10 the first car object has moved to such a degree that it is no longer located within the bounding volume $BV_2$, rather the first car object $610_1$ has moved such that it is located within the bounding volume $BV_4$. Thus, the physics engine 505 may update the integrated acceleration data structure 900 so that the node 865 corresponding to $BV_4$ branches to the object node 760 corresponding to the first car object 610.

Figure 11:
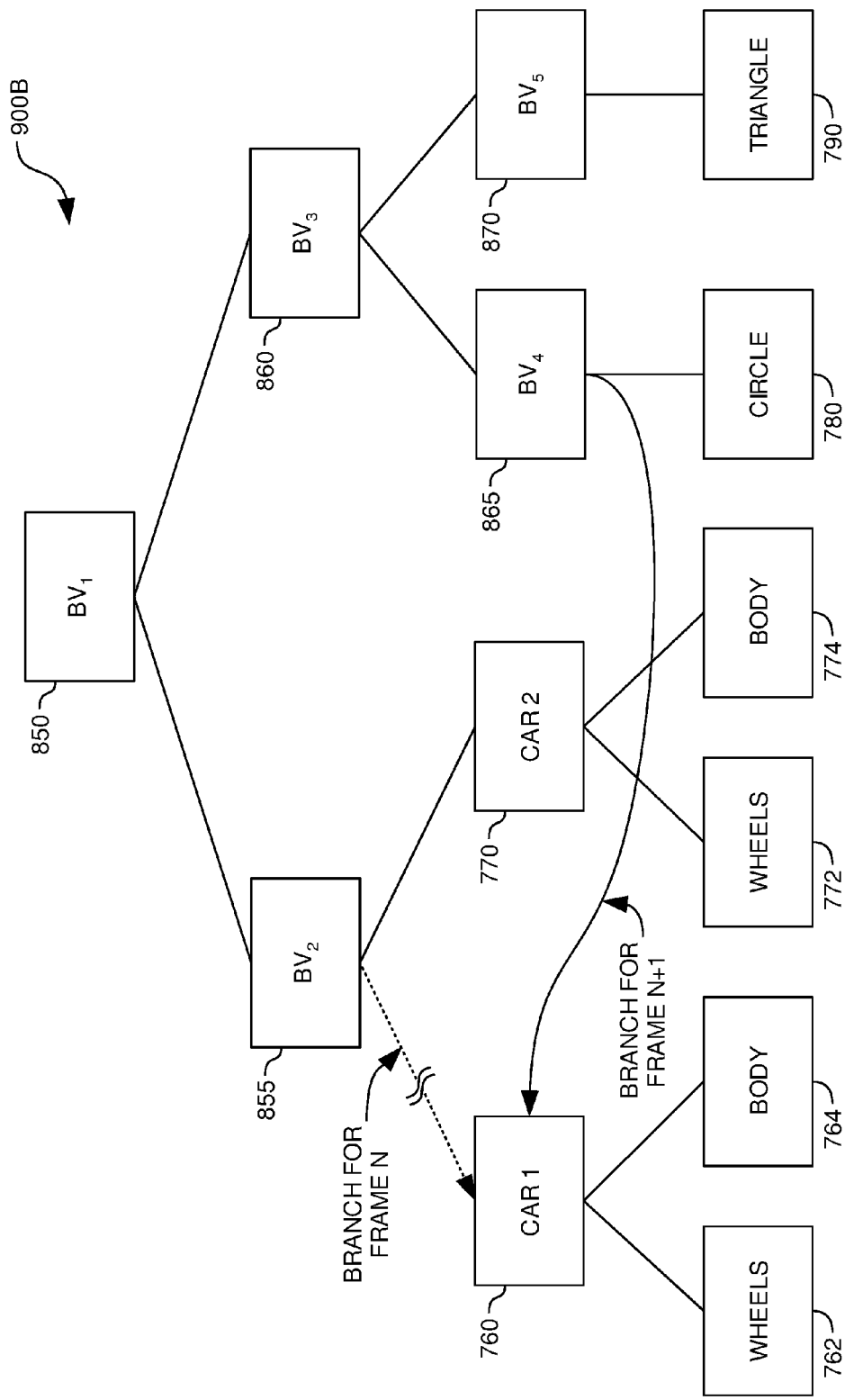

For example, FIG. 11 illustrates an updated integrated acceleration data structure 900B which reflects the new position of the first car object $610_1$. The branch from the node 855 corresponding to $BV_2$ to the object node 760 corresponding to the first car object $610_1$ may have been removed or deleted by the physics engine 505 to reflect the movement of the first car object $610_1$ out of the bounding volume $BV_2$. Furthermore, a new branch from the spatial index node 865 corresponding to $BV_4$ to the object node 760 corresponding to the first car object $610_1$ may have been added by the physics engine 505 to reflect the movement of the first car object $610_1$ into the bounding volume $BV_4$. Thus, the new position of the first car object $610_1$ in the three-dimensional scene 605 is now reflected in the updated integrated acceleration data structure 900B.

As illustrated in FIG. 11, the remaining nodes and branches in the updated integrated acceleration data structure 900B are the same as in the integrated acceleration data structure 900 because (in this simple example) no other objects moved from frame N to frame N+1. The image processing system may now use the updated integrated acceleration data structure 900B to render a two-dimensional image from the three-dimensional scene 605, and the physics engine 505 may use the updated integrated acceleration data structure 900B to perform physics related calculations.

A Single Combined Spatial Index for Static and Dynamic Objects

In some circumstances, ray-tracing image processing may be used in conjunction with a physics engine to provide animation. For example, ray-tracing image processing may be used in conjunction with a physics engine (e.g., in a game system) to simulate and display the physical behavior of objects within a three-dimensional scene. Objects within the three-dimensional scene may be considered either dynamic objects or static objects. Dynamic objects may be moved or changed by a physics engine over time, while static objects may stay in the same shape or position within the three-dimensional scene over time. In order to provide animation, the physics engine may move dynamic objects within the three-dimensional scene and a ray-tracing image processing system may render a frame (two-dimensional image) which illustrates the objects in the three-dimensional scene. The moving of objects and rendering of the three-dimensional scene may occur many times per second (e.g., 30-60 times per second) in order to provide realistic animation.

As described above, a spatial index (e.g., an acceleration data structure) may be used in image processing systems to accelerate ray-tracing image processing. An efficient spatial index which accurately partitions the three-dimensional scene according to the positions of objects within the scene may take a relatively long amount of time to construct. Therefore, it may not be efficient to rebuild or recreate a spatial index each time an object moves within the three-dimensional scene (e.g., a dynamic object).

However, one technique to manage a three-dimensional scene containing different types of objects (i.e., static and dynamic objects) without rebuilding the entire spatial index each time a dynamic object moves is to create two separate acceleration data structures. For example, one acceleration data structure may partition the three-dimensional scene with respect to the dynamic objects, while another acceleration data structure may partition the three-dimensional scene with respect to static objects. By having two separate acceleration data structures, only the dynamic spatial index may need to be rebuilt in response to the movement of dynamic objects within the scene. However, when using a ray-tracing image processing system to render a frame, this technique may require casting and tracing twice the number of rays (i.e., a first set of rays cast into the static acceleration data structure and a second set of rays cast into the dynamic acceleration data stricture). Increasing rays may increase the workload experienced by the image processing system and may increase the time required to render the scene thereby offsetting some of the gains in efficiency achieved by using the two spatial indexes. Therefore, two spatial indexes may not be desirable in an image processing system when used in conjunction with other systems to provide animation. However, according to embodiments of the invention, a single spatial index may be built which partitions the three-dimensional scene with respect to both static and dynamic objects.

According to embodiments of the invention, the image processing system may create separate spatial indexes for static and dynamic objects. Furthermore, the image processing system may link the static spatial index to the dynamic spatial index (or indexes) in order to create a combined spatial index. The final combined spatial index (combined acceleration data structure) may then be used by the image processing system to perform ray-tracing. Consequently, the image processing system may only need to issue a single set of rays through the combined acceleration data structure. Furthermore, when the dynamic objects move within the three-dimensional scene, the portions of the combined spatial index which reflect the positions of the dynamic objects may be easily modified to reflect new positions of the dynamic objects.

Figure 12:
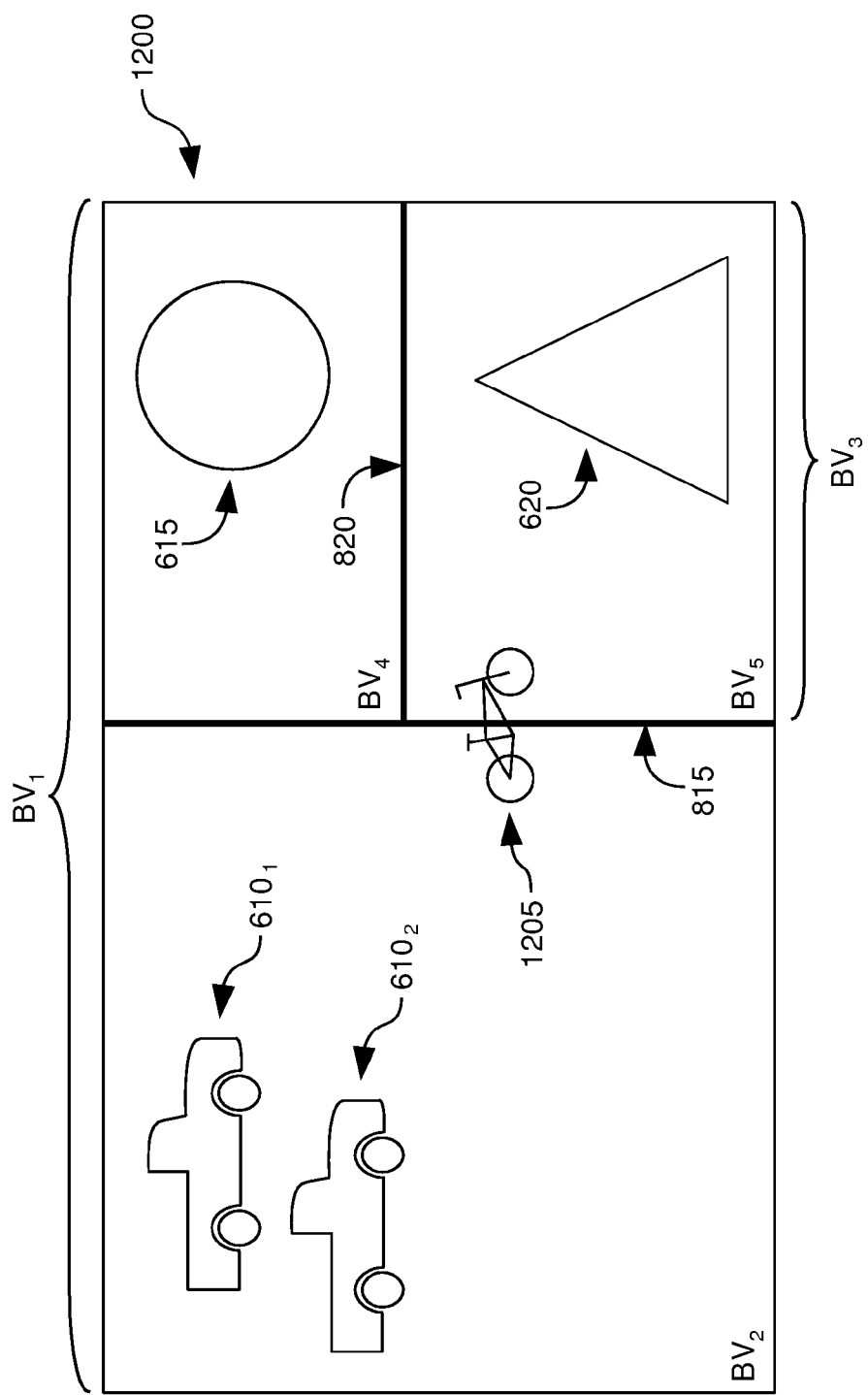
FIGS. 12 and 16 illustrate exemplary three-dimensional scene to be rendered by an image processing system, according to embodiments of the invention.

Creating a Combined Spatial Index for an Exemplary Three-Dimensional Scene Containing Static and Dynamic Objects FIG. 12 illustrates an exemplary three-dimensional scene 1200 containing both static and dynamic objects. The static objects within the three-dimensional scene 1200 are the first car object 610$_1$, the second car object 610$_2$, the circle object 615, and the triangle object 620. The three-dimensional scene 1200 also contains a dynamic bicycle object 1205. With the exception of the dynamic bicycle object 1205, the three-dimensional scene 1200 is the same as the three-dimensional scene 1200 illustrated in FIG. 6, and therefore may be partitioned in a similar fashion (e.g., using partitioning planes 815 and 820) resulting in a similar bounding volumes (e.g., BV$_1$-BV$_5$).

Figure 13:
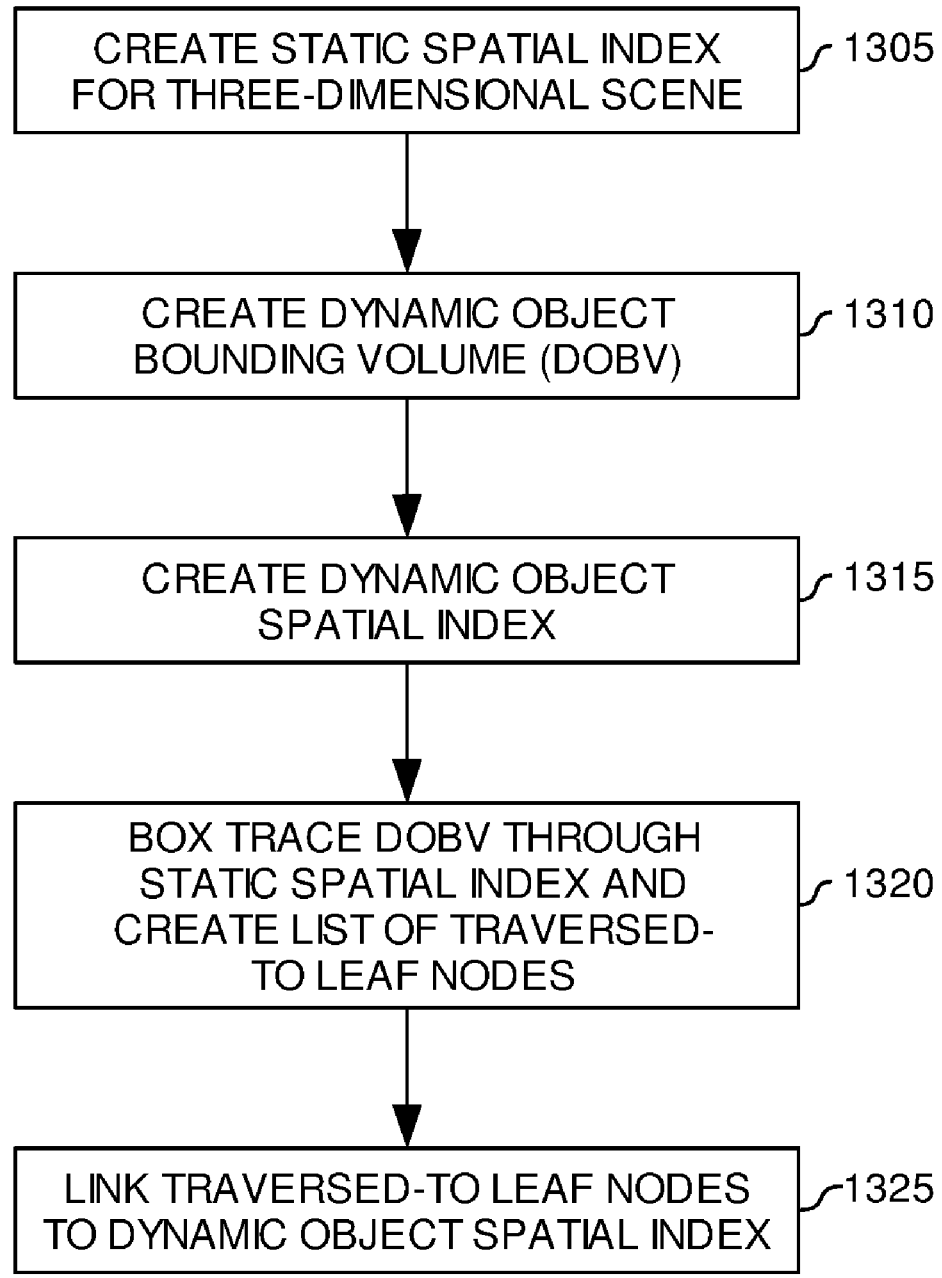
FIGS. 13 and 19 are flowcharts illustrating exemplary methods of creating a combined spatial index, according to embodiments of the invention.

According to embodiments of the invention, an image processing system may create a combined spatial index which partitions the three-dimensional scene with respect to the positions of both the dynamic objects and the static objects within the three-dimensional scene. FIG. 13 is a flowchart which illustrates an exemplary method 1300 for creating a combined spatial index.

Figure 14:
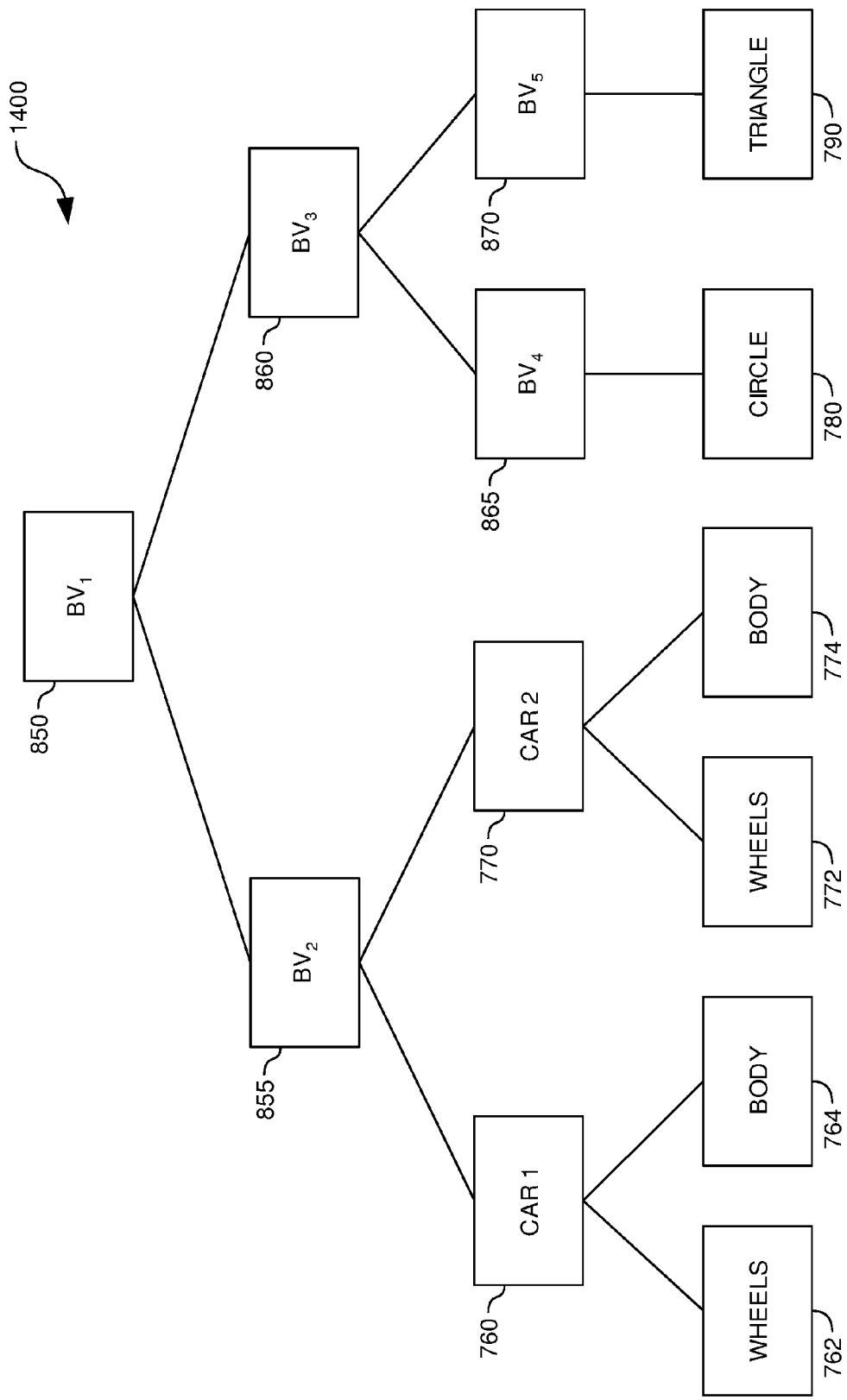
FIG. 14 illustrates an exemplary spatial index, according to one embodiment of the invention.

The method 1300 may begin at step 1305 where the image processing system may create a spatial index based on the static objects within a three-dimensional scene (static spatial index). For example, based on the static objects (i.e., the first car object 610$_1$, the second car object 610$_2$, the circle object 615, and the triangle object 620) within the three-dimensional scene 1200, the image processing system may create static spatial index 1400 illustrated in FIG. 14. The static spatial index 1400 may be similar to the integrated acceleration data structure 900 illustrated in FIG. 9 which was created based on the three-dimensional scene 605. Although the static spatial index 1400 is illustrated as an integrated acceleration data structure in FIG. 14, other embodiments of the invention may create a different type of spatial index for the static objects (e.g., a kd-tree).

Next at step 1310 of method 1300, the image processing system may create a dynamic object bounding volume (hereinafter DOBV) for a dynamic object within the three-dimensional scene. The DOBV may be created such that it completely surrounds the dynamic object. For example, multiple splitting planes may be drawn to create a volume which totally surrounds the dynamic bicycle object 1205. FIG. 15 illustrates a DOBV BV$_A$ created for the dynamic bicycle object 1205.

Next, at step 1315, the image processing system may create a dynamic object spatial index. The dynamic object spatial index may be created by partitioning the DOBV into smaller bounding volumes. This process may be similar to the spatial index creation process described above with respect to FIGS. 4A-4C. The nodes of the resulting dynamic object spatial index may contain information which defines the DOBV and bounding volumes which partition the DOBV (e.g., the splitting axes along which the splitting planes are drawn and the location of the splitting plane along the splitting plane axes).

For example, in FIG. 15 the bounding volume BV$_A$ which surrounds the dynamic bicycle object 1205 may be partitioned by drawing splitting planes (e.g., axis-aligned splitting plane 1550 and axis-aligned splitting plane 1555) to create several bounding volumes (e.g., BV$_B$-BV$_E$). The bounding volumes (BV$_A$-BV$_E$) may be defined by nodes (e.g., nodes 1505-1525) in a corresponding dynamic object spatial index 1500.

Next, at step 1320 of method 1300, the image processing system may box trace the DOBV through the static spatial index which was created based on the static objects within the three-dimensional scene. For example, the DOBV BV$_A$ which surrounds the dynamic bicycle object 1205 may be box traced through the static spatial index 1400 created in step 1305.

Box tracing may be (roughly) defined as traversing a bounding volume through a spatial index (in a similar manner as traversing the spatial index with a ray cast into the scene). This may include testing the location and dimensions of a bounding volume (e.g., a box) against bounding volumes defined by the nodes of a spatial index to determine if a portion of the box intersects, or is within, the bounding volumes defined by the nodes.

Figure 16:
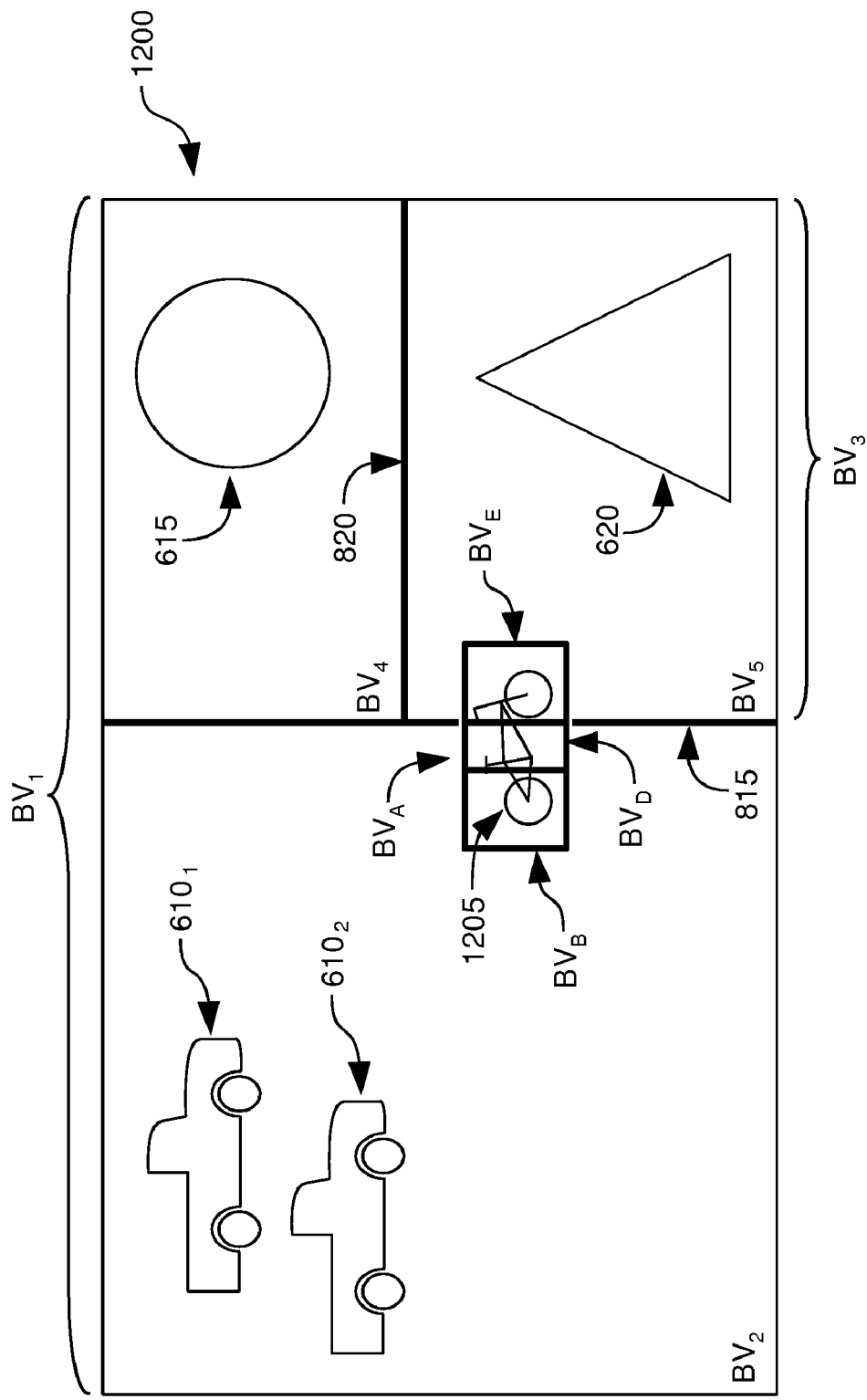

By box tracing the DOBV through the static spatial index, the image processing system may determine which bounding volumes of the static spatial index the DOBV exists within. For example, FIG. 16 illustrates the dynamic bicycle object 1205 in the three-dimensional scene 1200 and surrounded by the DOBV BV$_A$. As can be seen in FIG. 16, the DOBV BV$_A$ exists within both bounding volume BV$_2$ and bounding volume BV$_3$. Therefore, box tracing DOBV BV$_A$ through the static spatial index 900 which partitions the three-dimensional scene 1200 should indicate that the DOBV BV$_A$ exists within both bounding volume BV$_2$ and bounding volume BV$_3$.

Figure 17:
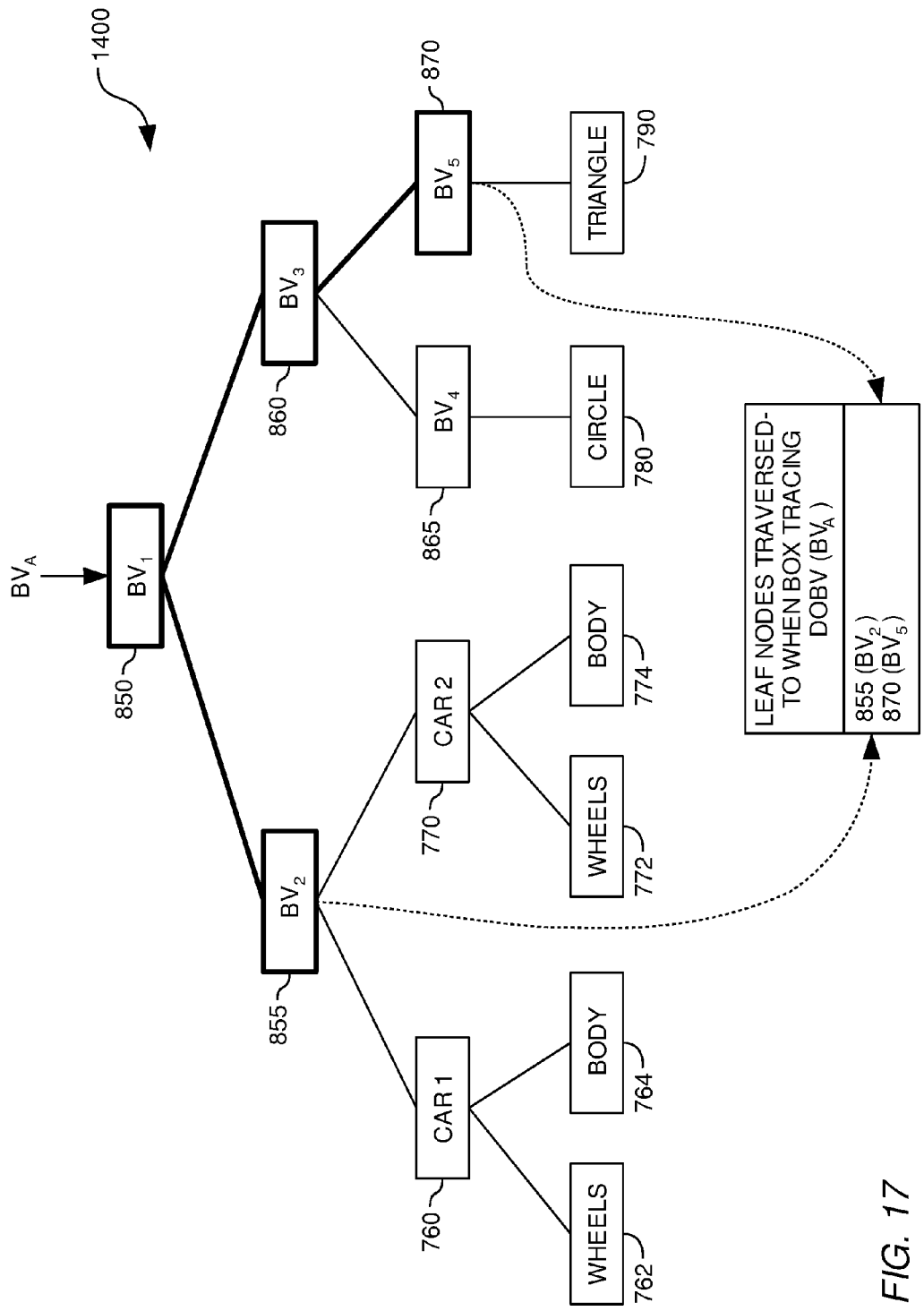
FIGS. 17, 20 and 21 illustrate traversal of bounding volumes through spatial indexes, according to embodiments of the invention.

For example, FIG. 17 illustrates the traversal of the DOBV BV$_A$ through the static spatial index 1400. The image processing system may begin box tracing or traversing the DOBV BV$_A$ through the static spatial index 1400 by determining if the DOBV BV$_A$ is within or intersects the bounding volume defined by the world node 850 (i.e., BV$_1$). As can be seen in FIG. 16, the DOBV is within the bounding volume defined by the world node 850 (i.e., BV$_1$), and therefore the results of the image processing system's intersection tests will indicate the intersection. Intersection of the DOBV BV$_A$ with a bounding volume defined by nodes (e.g., world node 850) in the static spatial index 1400 is illustrated in FIG. 17 by the darkened outline of the nodes (e.g., the darkened outline of the world node 850).

Next, the image processing system may continue to traverse static spatial index 1400 by performing intersection tests to determine if the DOBV $BV_A$ intersects or is within the bounding volumes defined by the nodes beneath the world node 850 (i.e., $BV_2$ and $BV_3$). The image processing system may determine from these tests that the DOBV $BV_A$ is within or intersects the bounding volumes defined by the nodes beneath the world node 850 (i.e., the DOBV $BV_A$ intersects both $BV_2$ and $BV_3$). The image processing system may then continue traversing the static spatial index 1400 by taking the branches from the world node 850 to the nodes beneath the world node 850.

According to one embodiment of the invention, the image processing system may continue traversing or box tracing through the static spatial index 1400 until leaf nodes are reached. A leaf node of the static spatial index may be a node which defines a bounding volume within the three-dimensional scene which is not further partitioned by a splitting plane. By traversing the spatial index until a leaf node is reached, an image processing system may apply the embodiments of the invention when using spatial indexes such as kd-trees as well as in the present example of an integrated acceleration data structure.

As illustrated in FIG. 16, the image processing system may take a branch from node 850 (defining bounding volume $BV_1$) to node 855 (defining bounding volume $BV_2$). Because node 855 is a leaf node, the image processing system may add leaf node 855 to a list of traversed-to leaf nodes to be used later in method 1300.

The image processing system may also take the branch from node 850 (defining bounding volume $BV_1$) to the node 860. Node 860 is an internal node thus the image processing system may perform intersection tests with the nodes beneath node 860 (i.e., node 865 and node 870) to determine if the DOBV $BV_A$ is within or intersects the bounding volumes defined by the nodes beneath node 860 (i.e., $BV_4$ and $BV_5$). As can be see in FIG. 16, a portion of the DOBV $BV_A$ is within $BV_5$ but no portion of DOBV $BV_A$ is within $BV_4$. Therefore, the image processing system may take the branch to node 870 as illustrated by the darkened outline of node 870 in FIG. 17. The intersection with $BV_5$ and not $BV_4$ is illustrated in FIG. 17 by the darkened outline of node 870 which corresponds to $BV_5$, but no darkened outline of node 865 corresponding to $BV_4$. Furthermore, because $BV_5$ is a leaf node the image processing system may add the leaf node 807 which defines $BV_5$ to the list of leaf nodes traversed-to while traversing DOBV $BV_A$ through the static spatial index 1400.

After the image processing system has finished box tracing the DOBV $BV_A$ through the static spatial index 1400 (i.e., determined all leaf nodes intersected by the DOBV $BV_A$), at step 1325, the image processing system may create links from the traversed-to leaf nodes of the static spatial index 1400 (indicated in the list of traversed-to leaf nodes) to the world node of the dynamic object spatial index which was created for the dynamic object in step 1315.

Figure 18:
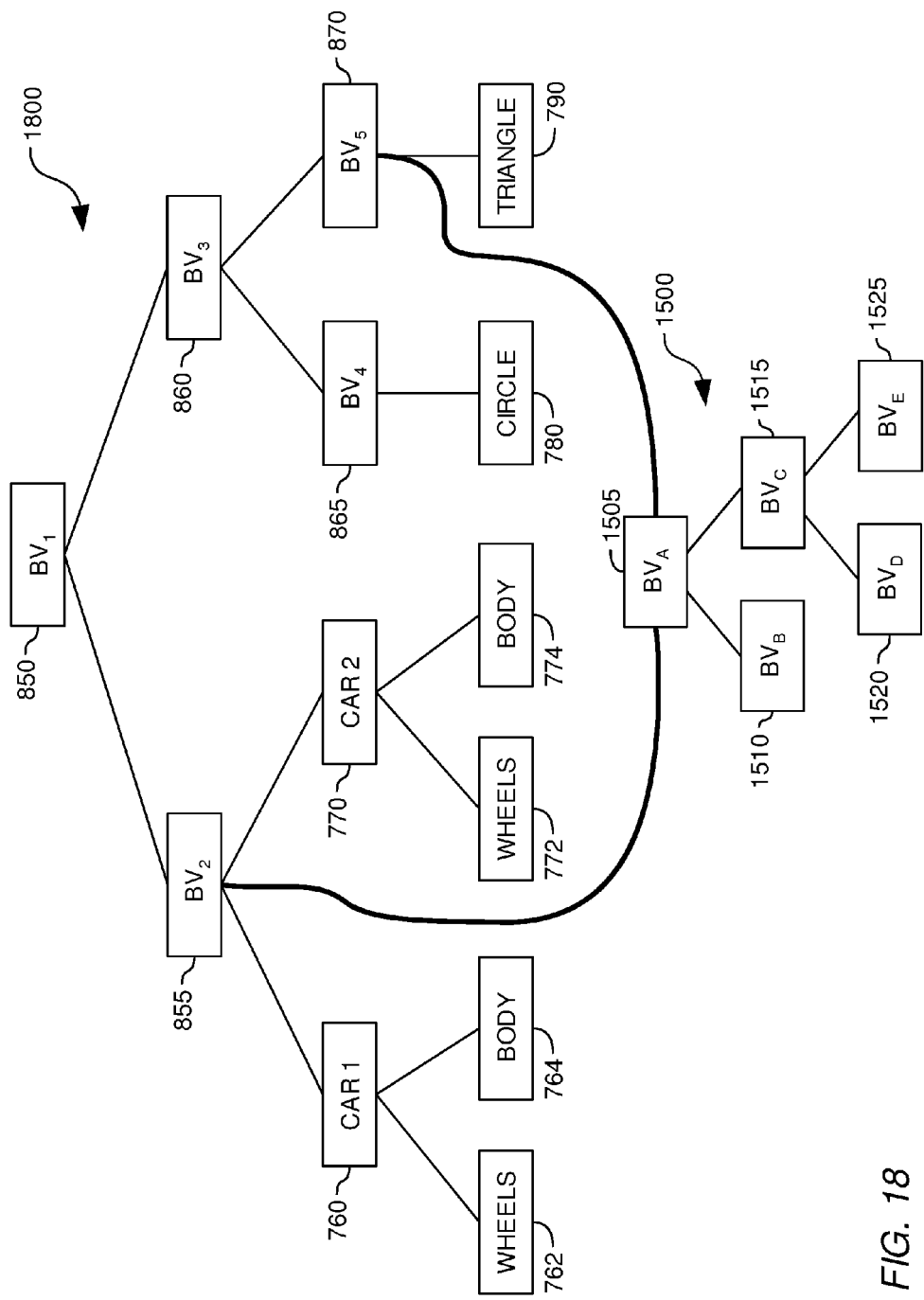
FIGS. 18 and 22 illustrate exemplary combined spatial indexes, according to embodiments of the invention.

For example, as illustrated in FIG. 18 the image processing system may create a link from node 855 (corresponding to $BV_2$) to the world node 1505 of the dynamic object spatial index 1500, and a link from node 870 (corresponding to $BV_5$) to the world node 1505 of the dynamic object spatial index 1500.

By creating links from the static spatial index 1400 to the dynamic object spatial index 1500, the image processing system creates a single combined spatial index 1800 or combined acceleration data structure which is partitioned according to the positions of both static objects and dynamic objects within the three-dimensional scene. When performing ray tracing, the image processing system may trace a ray through the combine spatial index to a leaf node of the spatial index (e.g., node 870) which branches to the world node 1505 of the dynamic object spatial index 1500 portion of the combine spatial index 1800. The image processing system may then perform ray-bounding volume intersection tests with the bounding volume defined by the world node of the dynamic object spatial index to determine if the ray intersects the DOBV. If so, the image processing system may begin traversing the ray through the dynamic object spatial index 1500 portion of the combine spatial index 1800. Therefore, when using a combine spatial index the image processing system may only need to traverse rays issued into the three-dimensional scene through the combined spatial index 1800 to determine if the ray intersects static objects or dynamic objects within the three-dimensional scene. Therefore, in contrast to having two separate spatial indexes for static objects and dynamic objects, by having a single combine spatial index fewer rays may need to be traversed through spatial indexes to determine if the ray intersects objects within the three-dimensional scene.

Furthermore, as dynamic objects within the three-dimensional scene move, the image processing system may remove the links between static and dynamic spatial indexes which were created for a previous frame. Further, the image processing system may create new links corresponding to the new position of the dynamic objects, for example, by repeating steps 1320 and 1325 of method 1300.

Although described with regards to a single dynamic object, embodiments of the invention may be applied when multiple dynamic objects exist within the three-dimensional scene. For example, multiple dynamic objects may be represented in the combined spatial index by creating multiple dynamic objects spatial indexes which correspond to multiple dynamic objects within the three-dimensional scene and linking the static spatial index to each of the dynamic object spatial indexes.

Deep Placement of a Dynamic Object in a Combined Spatial Index

Although the embodiments of the invention described above provides a single combined spatial index 1800 which partitions the three-dimensional scene according to the positions of both dynamic and static objects, the image processing system may have to perform an unnecessary number of ray-bounding volume intersection tests when using the combined spatial index 1800.

For example, a ray may intersect the bounding volume $BV_5$ but not the bounding volume $BV_2$. Furthermore, the ray may intersect the DOBV $BV_A$. The image processing system may traverse the ray to node 870 of combined spatial index 1800 (i.e., because the ray intersects the bounding volume $BV_5$), but not to node 855 (i.e., because the ray does not intersect the bounding volume $BV_2$). Furthermore, because the ray intersects the DOBV $BV_A$ the image processing system using the combined spatial index 1800 may perform ray-bounding volume intersection tests with nodes 1505, 1510, 1515, 1520 and 1525 of the of the dynamic object spatial index portion 1500 of the combined spatial index 1800. These ray-bounding volume intersection tests may be unnecessary since the bounding volumes defined by nodes 1510 and 1520 (i.e., $BV_B$ and $BV_D$) do not exist within $BV_5$, and therefore there is no way the ray will intersect these bounding volumes (i.e., $BV_B$ and $BV_D$).

Consequently, by merely linking the leaf nodes of the static spatial index 1400 to the world node of the dynamic spatial index 1500, the image processing system may introduce an unnecessary burden or load (in terms of ray-bounding volume intersection tests) when performing ray-tracing.

However, according to one embodiment of the invention, the image processing system may reduce the number of ray-bounding volume intersection tests by performing deep placement of the dynamic object within the static spatial index. According to embodiments of the invention, deep dynamic object placement may link the leaf nodes of the static spatial index to specific portions of the dynamic object spatial index in order to reduce the number of ray-bounding volume intersection tests necessary to perform ray tracing with a combined spatial index.

Figure 19:
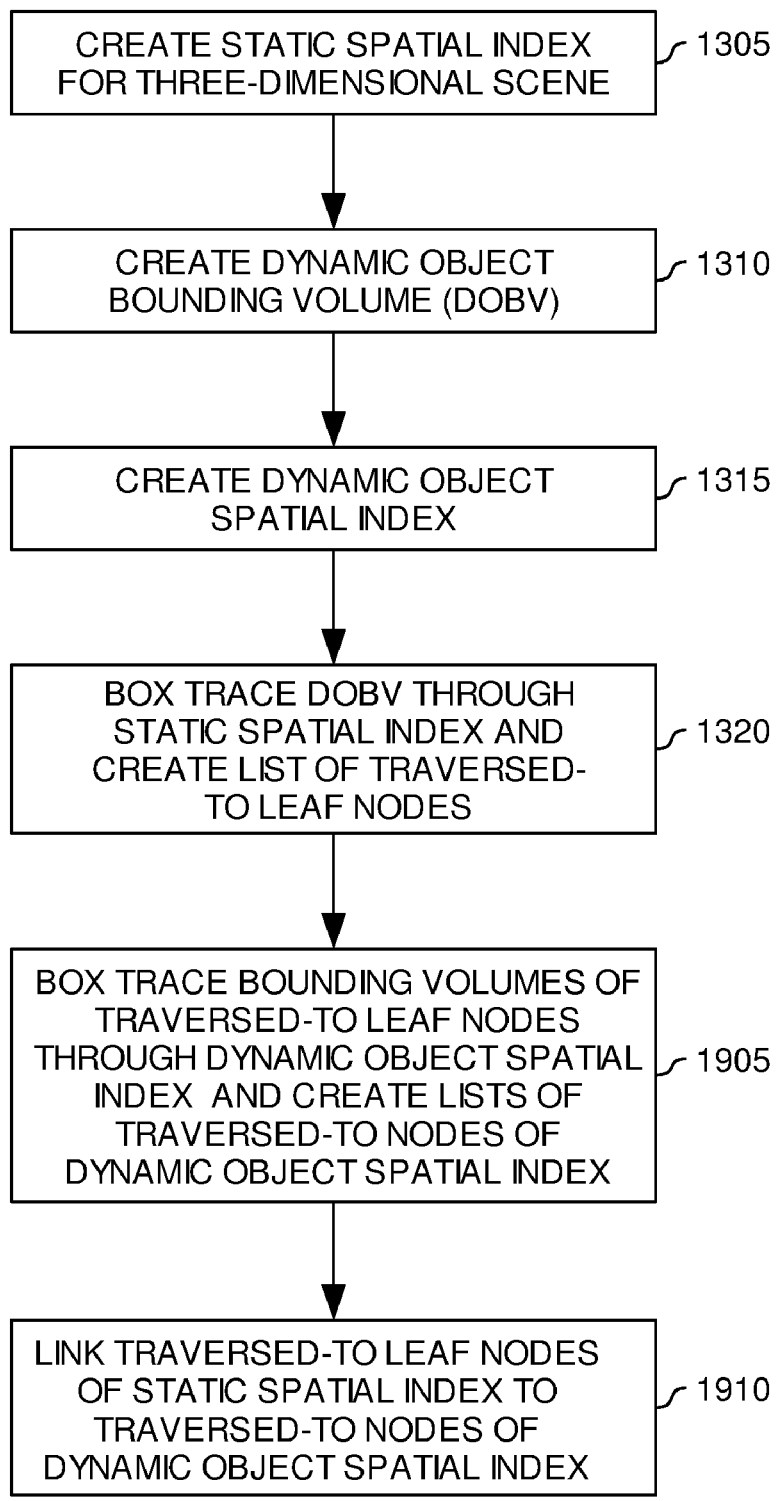

FIG. 19 is a flowchart which illustrates a method 1900 of performing deep dynamic object placement, according to one embodiment of the invention. The first four steps of the method 1900 are the same as the first four steps of method 1300. Those steps include creating a static spatial index based on the static objects within the three-dimensional scene (step 1305), creating a DOBV which surrounds a dynamic object (step 1310), creating a dynamic object spatial index by partitioning the DOBV (step 1315), and box tracing the DOBV through the static spatial index and creating a list of leaf nodes in the static spatial index which were traversed to (step 1320).

However, instead of linking the traversed-to leaf nodes of the static spatial index (step 1325 of method 1300) after performing box tracing and linking leaf nodes of the static spatial index to the world node of the dynamic object spatial index, the image processing system may proceed to step 1905. At step 1905, the image processing system may box trace the bounding volumes defined by the traversed-to leaf nodes of the static spatial index through the dynamic object spatial index.

By box tracing the bounding volumes defined by the traversed-to leaf nodes of the static spatial index through the dynamic object spatial index, the image processing system may determine which bounding volumes defined by nodes of the dynamic object spatial index exist within or intersect/overlap the bounding volumes defined by the traversed-to leaf nodes of the static spatial index.

For example, in step 1320 of method 1900 the image processing system may have box traced the DOBV $BV_A$ which surrounds the dynamic bicycle object 1200 through the static spatial index 1400. The image processing system may have determined that the DOBV $BV_A$ intersected or existed within two bounding volumes (i.e., $BV_2$ and $BV_5$) defined by two leaf nodes (i.e., node 855 and node 870) of the static spatial index 1400. Therefore, at step 1905 of method 1900 the image processing system may box trace the bounding volumes (i.e., $BV_2$ and $BV_5$) defined by the traversed-to leaf nodes of the static spatial index (i.e., node 855 and node 870) through the dynamic object spatial index 1500.

Box tracing may be (roughly) defined as traversing a bounding volume through a spatial index. This may entail testing the location and dimensions of a box (e.g., a bounding volume) against bounding volumes defined by the nodes of the static spatial index to determine if a portion of the box intersects or is within a bounding volume defined by a node of the spatial index. The image processing system may begin traversing the box static spatial index at the world node, and may take branches to nodes intersected by the box.

Figure 20:
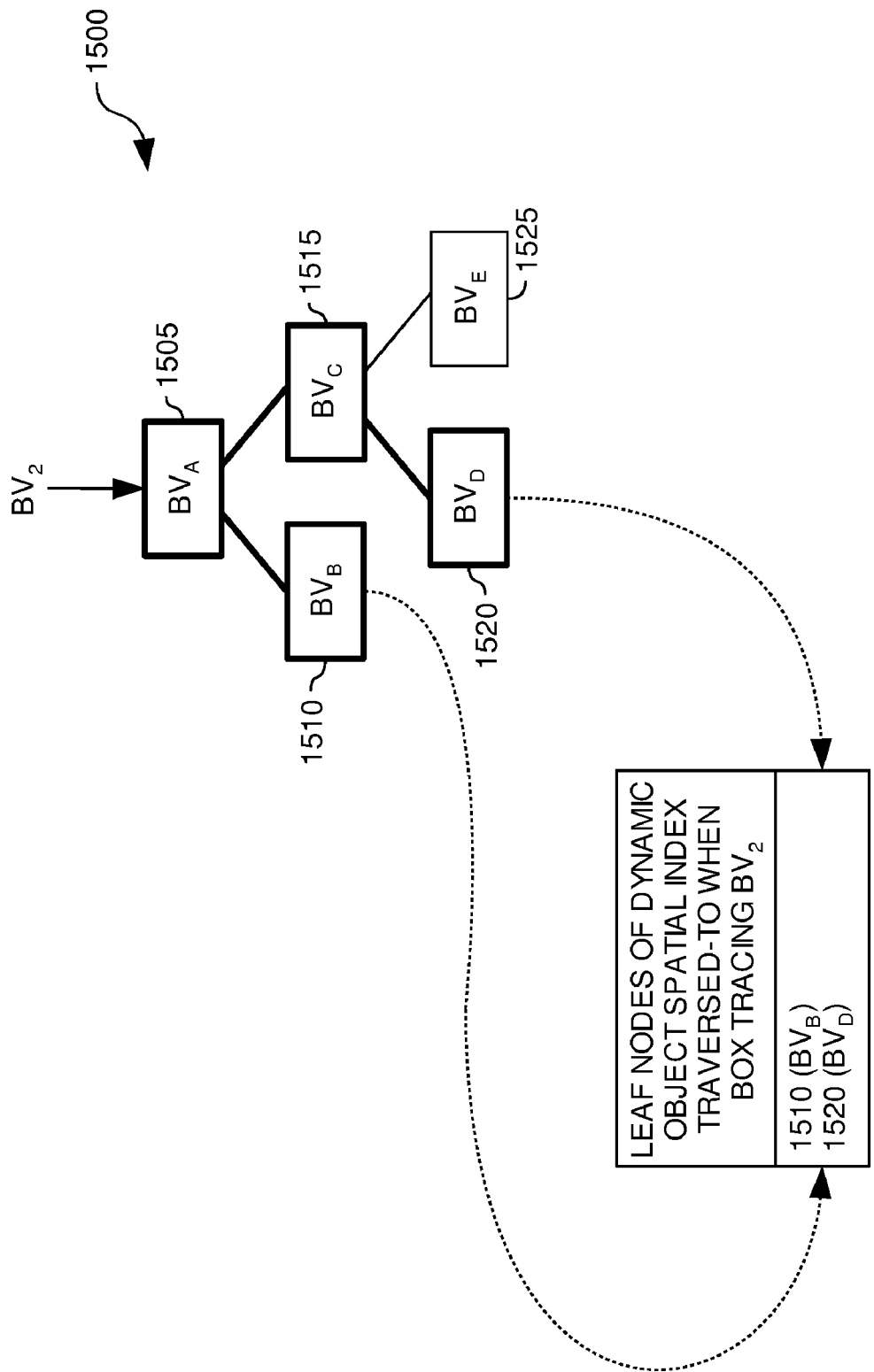

FIG. 20 illustrates the image processing system traversing the bounding volume $BV_2$ through the dynamic object spatial index 1500. The dynamic object spatial index 1500 bounding volumes which are intersected by the bounding volume $BV_2$ are illustrated in FIG. 20 by darkened outlines (i.e., nodes 1505, 1510, 1515, and 1520). Furthermore, as illustrated in FIG. 20, the image processing system traverses or box traces the bounding volume $BV_2$ to two leaf nodes of the dynamic objects spatial index. Specifically, leaf node 1510 and leaf node 1520 which define bounding volumes $BV_B$ and $BV_D$, respectively. By box tracing $BV_2$ through the dynamic object spatial index 1500, the image processing system has determined that the bounding volumes ($BV_B$ and $BV_D$) defined by leaf node 1510 and leaf node 1520 are within bounding volume $BV_2$. The bounding volumes defined by the two nodes (i.e., $BV_B$ and $BV_D$) may be added to a list of traversed-to leaf nodes which may be used later by the method 1900.

Figure 21:
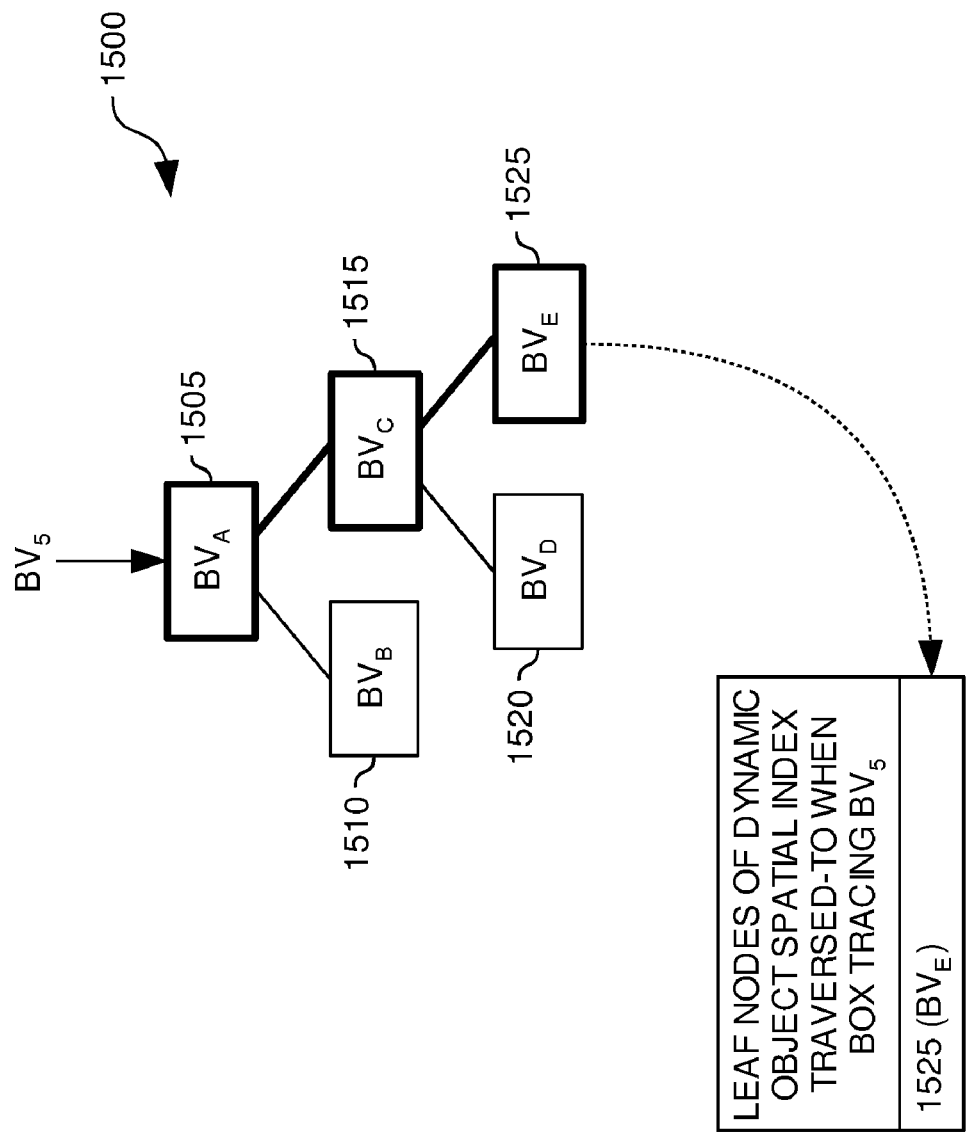

FIG. 21 illustrates the image processing system box tracing the bounding volume $BV_5$ through the dynamic object spatial index 1500. The dynamic object spatial index 1500 bounding volumes which are intersected by the traversed-to leaf node bounding volume $BV_5$ are illustrated in FIG. 21 by darkened outlines (i.e., nodes 1505, 1515, and 1525). Furthermore, as illustrated in FIG. 20, the image processing system traverses or box traces $BV_5$ to a single leaf node of the dynamic objects spatial index 1500. Specifically, leaf node 1525 which defines bounding volume $BV_E$. By box tracing $BV_5$ through the dynamic object spatial index 1500, the image processing system has determined that the bounding volume ($BV_E$) defined by leaf node 1525 is within $BV_5$. The bounding volume ($BV_E$) defined by leaf node 1525 may be added to a list of traversed-to leaf nodes which may be used later by the method 1900.

Next, at step 1910 of method 1900, the image processing system may link the traversed-to leaf nodes of the static spatial index to their respectively traversed-to leaf nodes of the dynamic spatial index (e.g., as stored in the respective lists of traversed-to leaf nodes). Thus, the image processing system may deeply place the dynamic object within a single combined spatial index.

Figure 22:
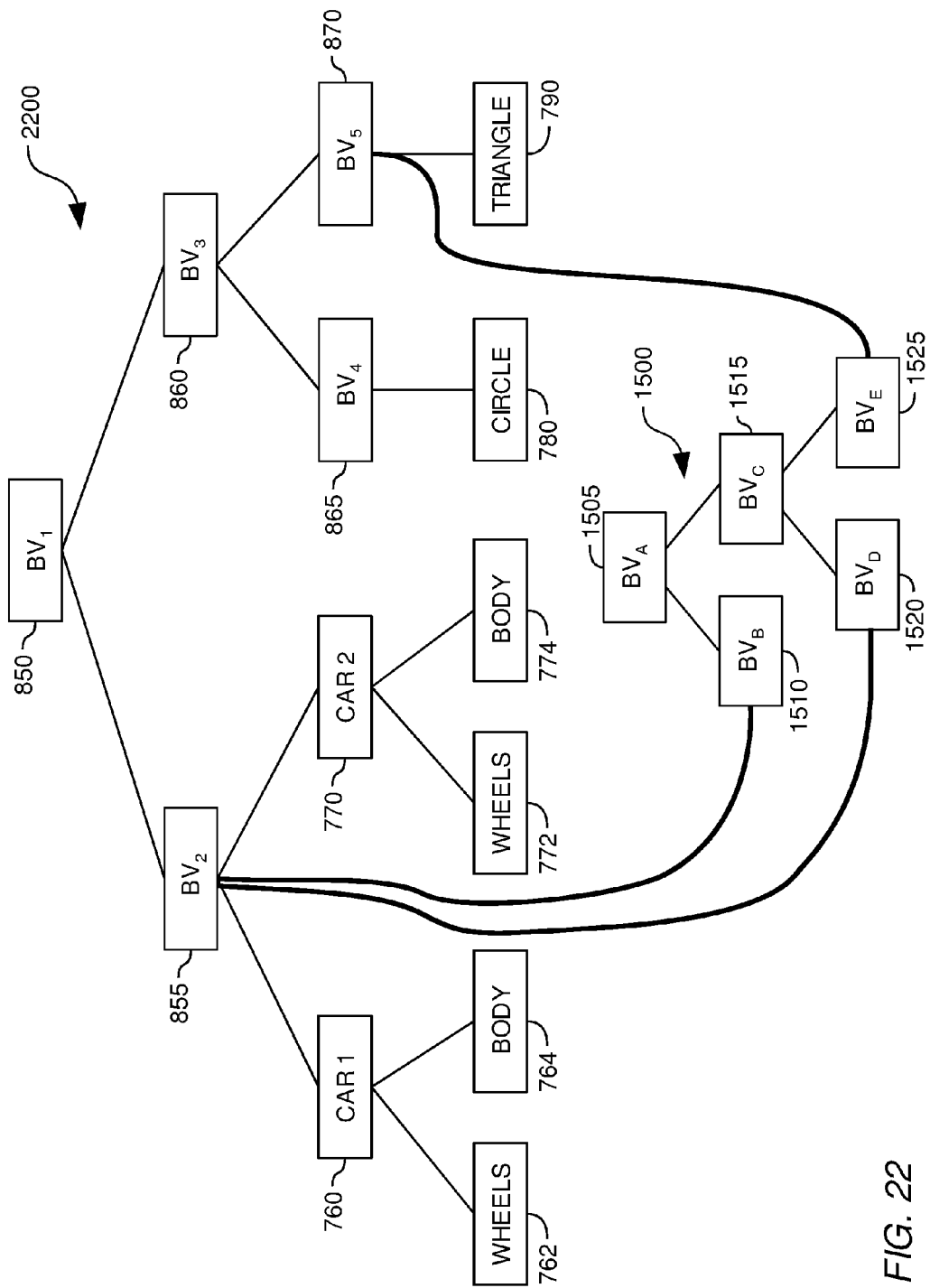

For example, FIG. 22 illustrates a combined spatial index 2200 wherein the dynamic bicycle object 1205 has been deeply placed into the combined spatial index 2200. As illustrated in FIG. 22, the image processing system may create links or branches from node 855 (defining bounding volume $BV_2$) based on the list of traversed-to leaf nodes which was created in step 1905 when the image processing system traversed $BV_2$ though the dynamic object spatial index 1500. Accordingly, the image processing system may create a link or a branch from node 855 (defining bounding volume $BV_2$) to the leaf node 1510 (defining bounding volume $BV_B$), and a link or a branch from node 855 (defining bounding volume $BV_2$) to the leaf node 1520 (defining bounding volume $BV_D$).

Furthermore, as illustrated in FIG. 22, the image processing system may also create links or branches from node 870 (defining bounding volume $BV_5$) based on the list of traversed-to leaf nodes which was created in step 1905 when the image processing system traversed bounding volume $BV_5$ though the dynamic object spatial index 1500. Accordingly, the image processing system may create a link or a branch from node 870 (defining bounding volume $BV_5$) to the leaf node 1525 (defining bounding volume $BV_E$).

Therefore, by creating links or branches from leaf nodes of the static spatial index to leaf nodes of the dynamic spatial index, the image processing system may deeply place the dynamic object within the combined spatial index 2200. Thereafter the image processing system may use the combined spatial index 2200 to accelerate ray-tracing image processing.

When the image processing system traverses a ray through the combined spatial index 2200 to the leaf node $BV_5$, the image processing system may perform ray-bounding volume intersection tests with the bounding volume defined by the leaf node $BV_E$ as well as intersection tests with the triangle object. By linking leaf node $BV_S$ directly to leaf node $BV_E$, the image processing system may reduce the number of ray-bounding volume intersection which are necessary when a ray intersects the bounding volume $BV_E$ tests by performing a ray-bounding volume intersection test only with bounding volume $BV_E$ and not with the other bounding volumes defined by the nodes within the dynamic spatial index portion 1500 of the combined spatial index 2200.

Although embodiments of the invention are described above as linking leaf nodes of the static spatial index to the world node or leaf nodes of the dynamic spatial index, other embodiments of the invention are contemplated which may link different nodes of the static spatial index (e.g., internal nodes, etc.) to different nodes of the dynamic spatial index (e.g., internal nodes, etc.).

Multiple Coordinate Systems for Objects in the Three-Dimensional Scene

As described above, dynamic objects within the three-dimensional scene may have unique spatial indexes (e.g., dynamic object spatial indexes) created when partitioning a bounding volume which surrounds the dynamic objects. Furthermore, in some circumstances the dynamic object may have its own coordinate system. In contrast to a world coordinate system which may have an origin at the center of the three-dimensional scene, a coordinate system unique to a dynamic object (hereinafter an object coordinate system) may have an origin located at the center of the dynamic object. Further, an object coordinate system may have unique coordinate system axes which may or may not be parallel to the global coordinate system axes.

A dynamic object may be constructed from a plurality of primitives (e.g., triangles, spheres, boxes, etc.). The dynamic object may be defined by a set of variables describing the object including, but not limited to, a dynamic object center (e.g., the origin of the object coordinate system) and a rotation of the object (or the object coordinate system) relative to the world coordinate system. The primitives which make up the dynamic object may be defined relative to the origin of the object coordinate system and may be defined without a rotational factor. In order to obtain the location of a primitive which makes up the dynamic object in world coordinate system coordinates, the center and rotation of the dynamic object may be added to the coordinates of the primitive in the object coordinate system. Updates to the position and/or rotation of the entire dynamic object may be accomplished by simply modifying the center of the object coordinate system and the rotation of the object coordinate system. Consequently, it may not be necessary to modify each individual primitive which makes up the dynamic object in order to modify the position or rotation of the dynamic object.

An object may also have a unique object coordinate system due to the loss of accuracy when specifying the location or coordinates of primitives which make up the object when the object is some distance away from the origin of the three-dimensional scene. The loss of accuracy may be attributed to the use of floating point numbers to specify the location of points within the three-dimensional scene. Many image processing systems use floating point numbers to specify the location of points within the three-dimensional scene. In an image processing system which uses floating point numbers, the farther a point from the origin of a coordinate system, the less accurate the coordinates are at specifying a location of a point. In contrast, the closer a point may be the origin of the coordinate system, the more accurate the coordinate system may be at specifying the location of the point. Therefore, if an object is located some distance from the world origin and an object coordinate system with an origin located at the center of a dynamic object is used, the object coordinate system may be more accurate at specifying the location of points which define the object than the world coordinate system.

Figure 23:
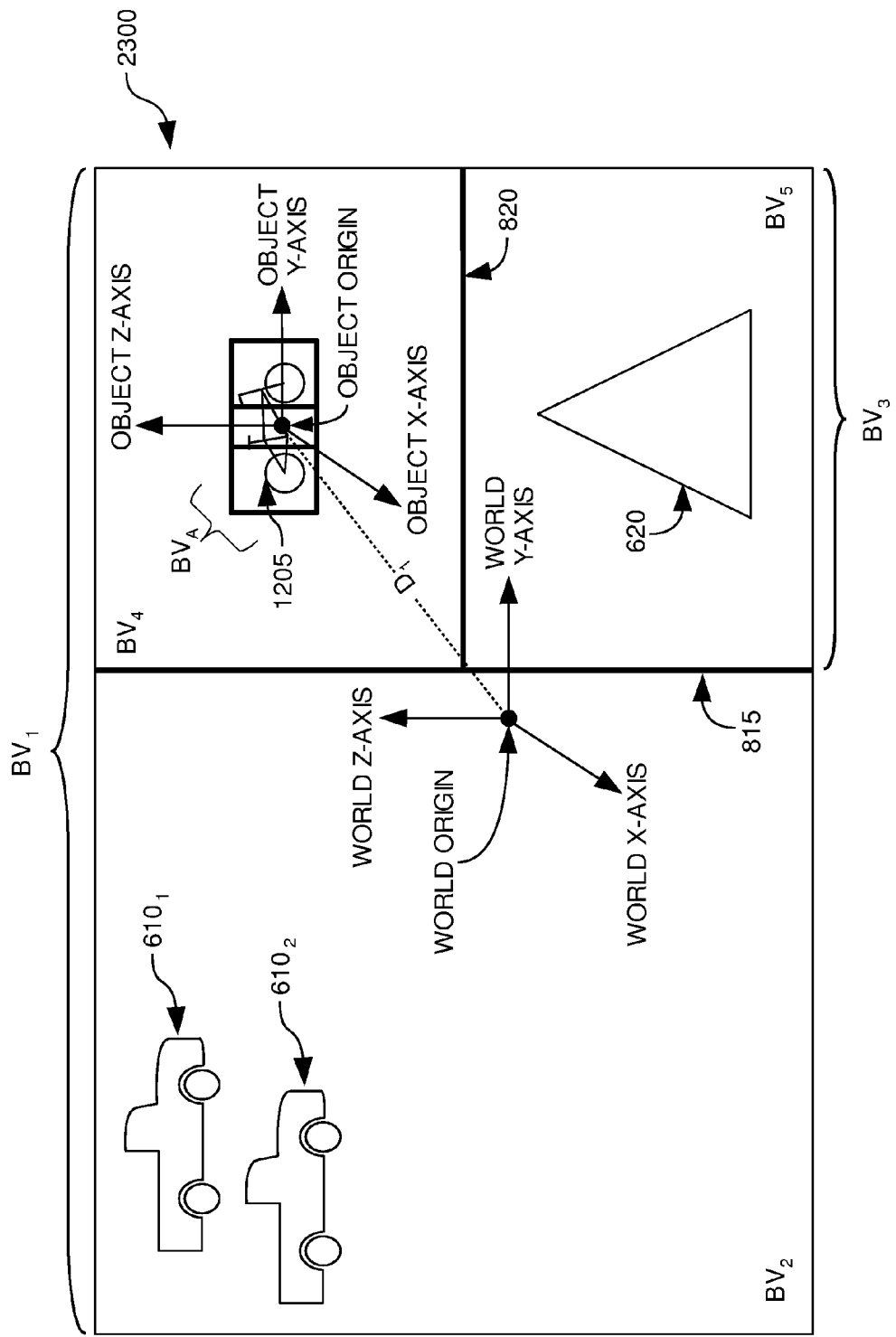
FIGS. 23, 25, 26, 27 and 28 illustrate exemplary three-dimensional scenes containing objects which are be rendered by an image processing system, according to embodiments of the invention.

FIG. 23 illustrates a three-dimensional scene 2300 similar to the three-dimensional scene 1200 described above with regards to FIG. 16. However, the circle object 615 has been removed from three-dimensional scene 2300, and the dynamic bicycle object 1205 has been moved to a location within the bounding volume $BV_4$. According to embodiments of the invention, the image processing system, or some other system responsible for tracking the movements of objects within the three-dimensional scene (e.g., the physics engine), may have created an object coordinate system for the bicycle object 1205. The object coordinate system may have an origin located in the center of the dynamic object (e.g., the center of the bicycle object 1205). Furthermore, the object coordinate system may be located some distance from the world coordinate system. For example, as illustrated in FIG. 23, the origin of the object coordinate system may be located a distance $d_1$ from the origin of the world coordinate system. Furthermore, as illustrated in FIG. 23, the object coordinate system may have axes (e.g., x-axis, y-axis, and z-axis) which are aligned with the axes of the world coordinate system. The location of the primitives which make up the dynamic bicycle object 1205 may be defined relative to the object coordinate system (i.e., in coordinates of the object coordinate system).

Figure 24:
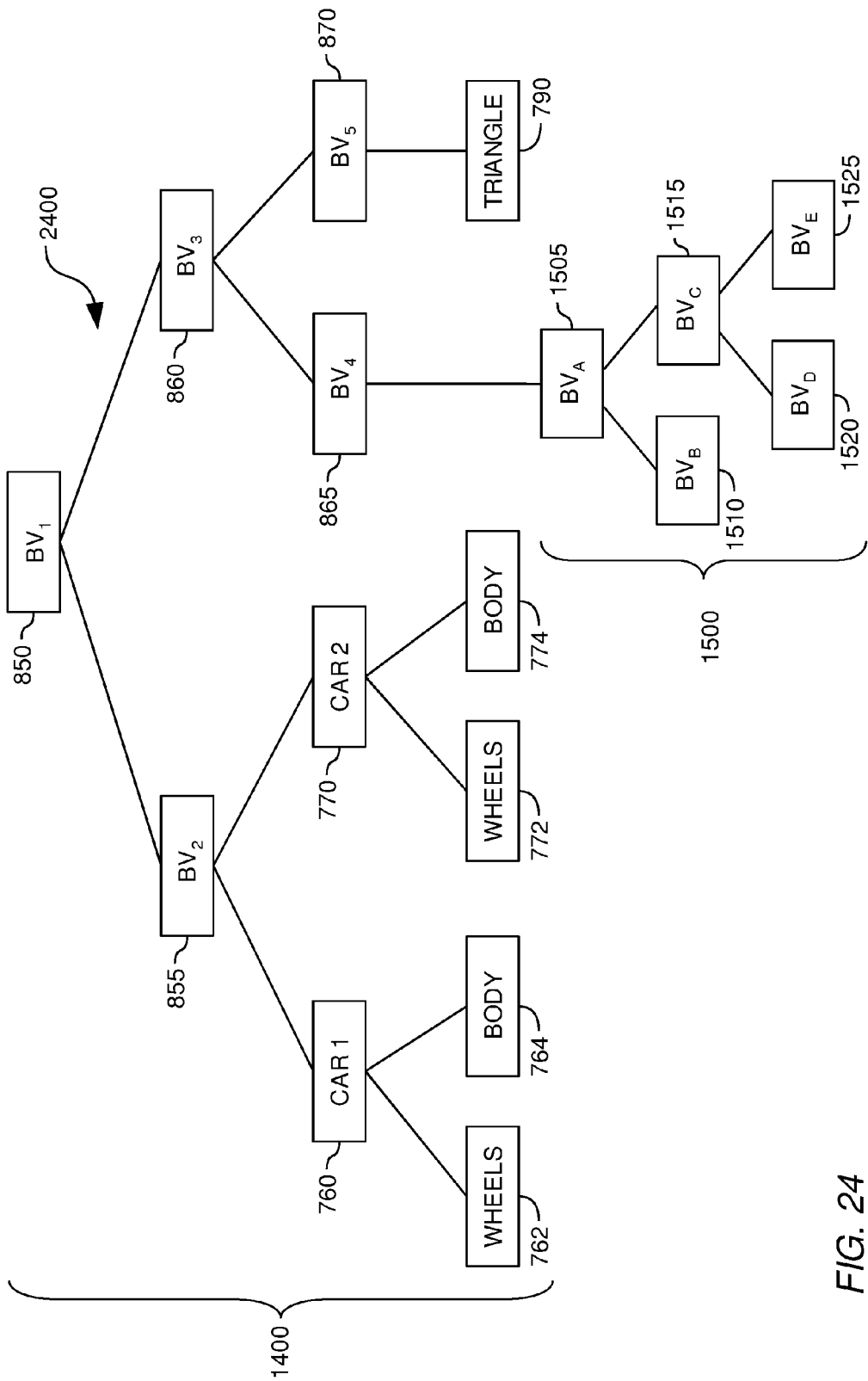
FIG. 24 illustrates an exemplary spatial index, according to one embodiment of the invention.

Also illustrated in FIG. 23, a bounding volume (e.g., $BV_A$) may be created which surrounds or bounds the dynamic object. The bounding volume surrounding the dynamic bicycle object ($BV_A$) may be partitioned, as described above with respect to FIG. 15, and the corresponding dynamic object spatial index 1500 may be linked to from a leaf node (e.g., leaf node 865) corresponding to the bounding volume (i.e., $BV_4$) within which the bicycle object 1205 is located. For example, as illustrated in FIG. 24 a combined spatial index 2400 may be formed from the static spatial index 1400 and the dynamic object spatial index 1500.

According to one embodiment of the invention, information which defines the object coordinate system may be stored within the dynamic object spatial index portion 1500 of the combined spatial index 2400. For example, the node 1505 corresponding to the bounding volume which surrounds the dynamic bicycle object 1205 (i.e., $BV_A$) may specify the location (e.g., in world coordinates) of the object coordinate system origin.

Figure 25:
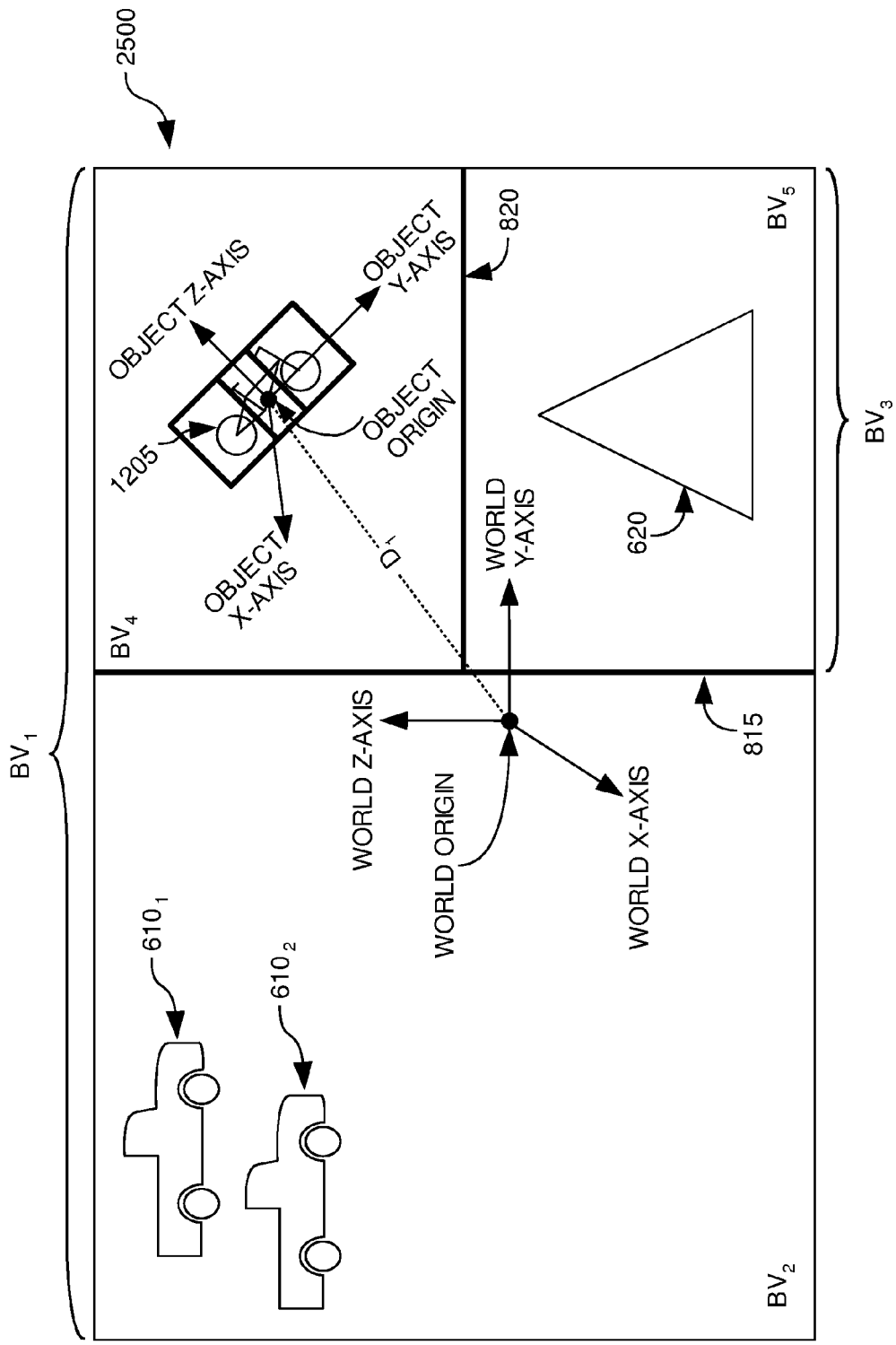

In some circumstances, the dynamic object may be rotated by the physics engine. Consequently, the axes of the object coordinate system may be rotated with respect to the world coordinate system. For example, as illustrated in FIG. 25, the bicycle object 1205 and the object coordinate system axes may be rotated in a clockwise direction with respect to the world coordinate system. In order to relate the positions of primitives which make up the object in the object coordinate system to points in world coordinates, the rotation of the object and the object coordinate system may be stored in the dynamic object portion 1500 of the spatial index 2400. The rotation and the location of the object coordinate system in world coordinates may be used to transform the coordinates of primitives in the object coordinate system into coordinates in the world coordinate system.

Figure 26:
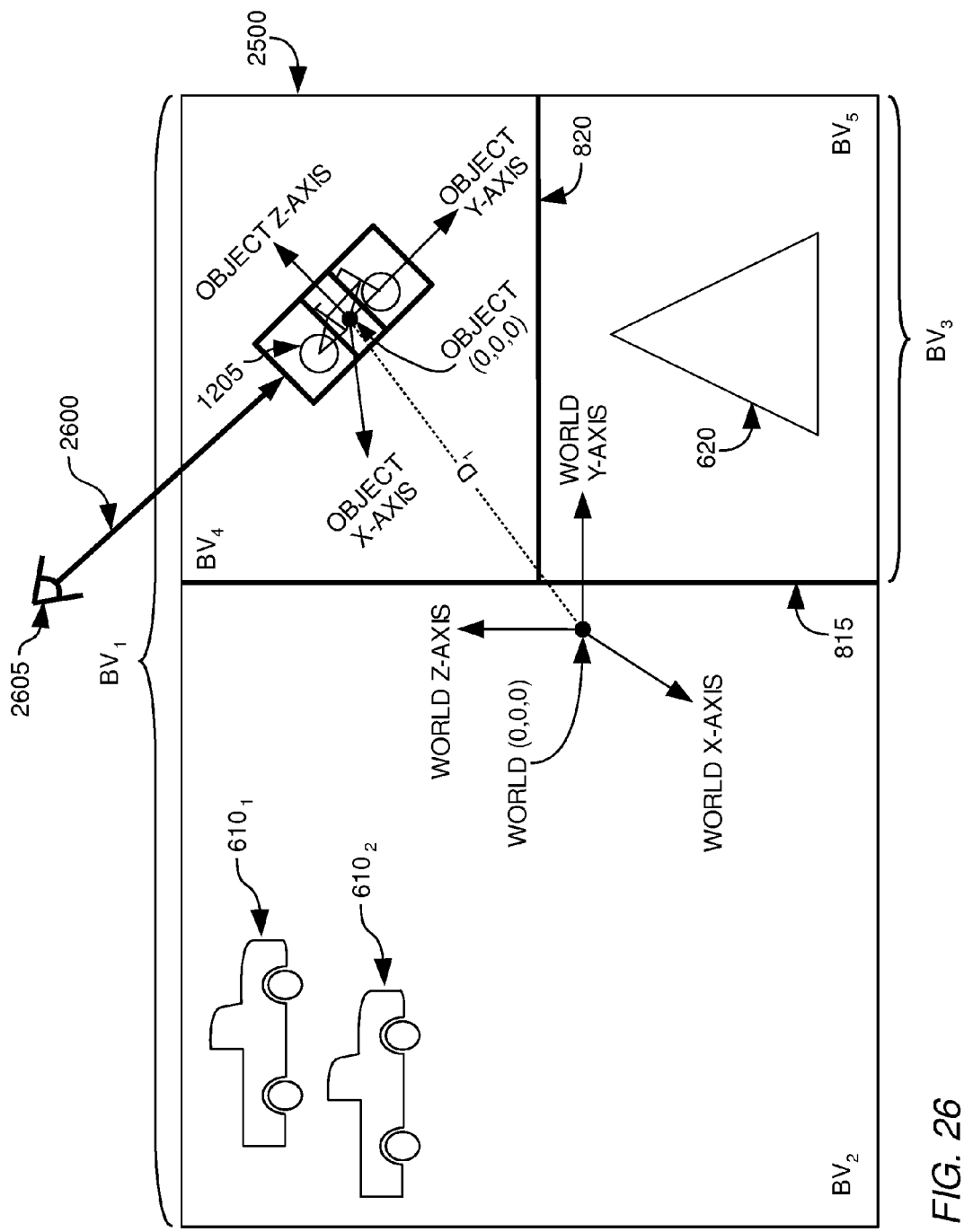

As illustrated in FIG. 26, an image processing system may issue a ray 2600 into a three-dimensional scene 2500 which contains the rotated dynamic bicycle object 1205. The three-dimensional scene 2500 is the same as described above with respect to FIG. 25 and, therefore, may be represented by the combined spatial index 2400 illustrated in FIG. 24. The ray 2600 may be issued from a view point 2605 and may have a trajectory such that it intersects the bounding volume ($BV_A$) which bounds the dynamic bicycle object 1205.

Dynamically Configuring and Selecting Multiple
Ray Tracing Intersection Methods

According to embodiments of the invention, when tracing rays through the dynamic object portion 1500 of the combined spatial index 2400, the image processing system may perform ray intersection tests (e.g., ray-bounding volume intersection tests and ray-primitive intersection tests) using one of two different techniques. One technique may be to translate or convert the location of or coordinates of primitives which make up the dynamic object (e.g., the coordinates of vertexes which form a triangle primitive) from the object coordinate system into coordinates in the world coordinate system. The image processing system may store the converted coordinates in the combined spatial index.

By converting the primitive coordinates, the image processing system may perform intersection tests with the rays in the world coordinate system. Consequently, the image processing system may trace rays through the entire spatial index without having to change coordinate systems when performing ray-intersection tests. This may reduce the amount of time required to perform ray tracing, however, this may increase the amount of time to build or prepare the spatial index for ray tracing. In order for the first technique to be efficient, the amount of processing workload (e.g., processing cycles) associated with executing ray intersection tests with the dynamic object must exceed the amount of processing workload required to convert the location of primitives which define the dynamic object from the object coordinate system into the world coordinate system. As described further below, this may occur when a large number of rays are likely to intersect the dynamic object when performing ray tracing.

Figure 27:
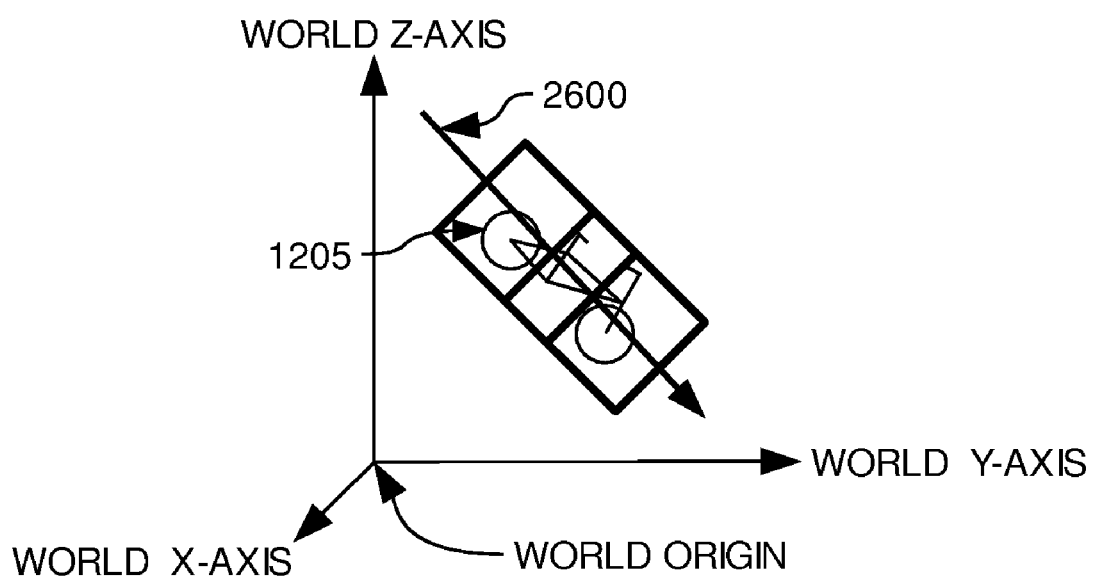

FIG. 27 illustrates the first technique. As illustrated in FIG. 27, the dynamic bicycle object 1205 remains rotated with respect to the world coordinate system, however the coordinates of the primitives which define the dynamic bicycle object 1205 may have been translated from the object coordinate system into the world coordinate system and stored in the combined spatial index. Additionally, FIG. 27 illustrates the trajectory of the ray remains in the world coordinate system when using the first technique.

According to embodiments of the invention, a second technique of performing ray intersection tests may be to translate the trajectory of rays which are traversed to the dynamic object portion of the combined spatial index from trajectories in the world coordinate system into trajectories in the object coordinate system, and perform ray intersection tests in the object coordinate system. The trajectories of a ray may be translated into the object coordinate system using the origin of the object coordinate system and the rotation of the object. In order for the second technique to be efficient, the processing workload required to convert the location of primitives which define the dynamic object from the object coordinate system to the world coordinate system must exceed the amount of processing workload associated with executing ray intersection tests in the object coordinate system. As described further below, this may occur when a small number of rays are likely to intersect the dynamic object when performing ray tracing.

Figure 28:
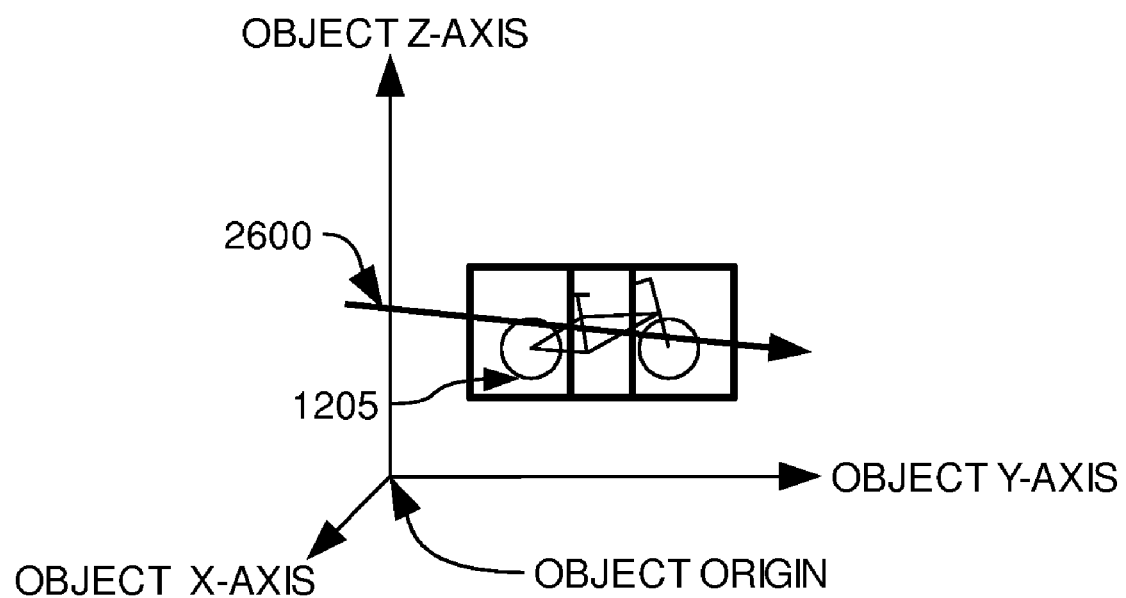

FIG. 28 illustrates the second technique. As illustrated in FIG. 28, the trajectory of a ray may be translated into the object coordinate system when a ray is traversed to the dynamic object portion of the spatial index. Additionally, FIG. 28 illustrates the object remains in the object coordinate system when using the second technique. In various circumstances described further below (i.e., with respect to FIG. 30), either the first technique or the second technique may be more efficient to use when performing ray tracing.

Figure 29:
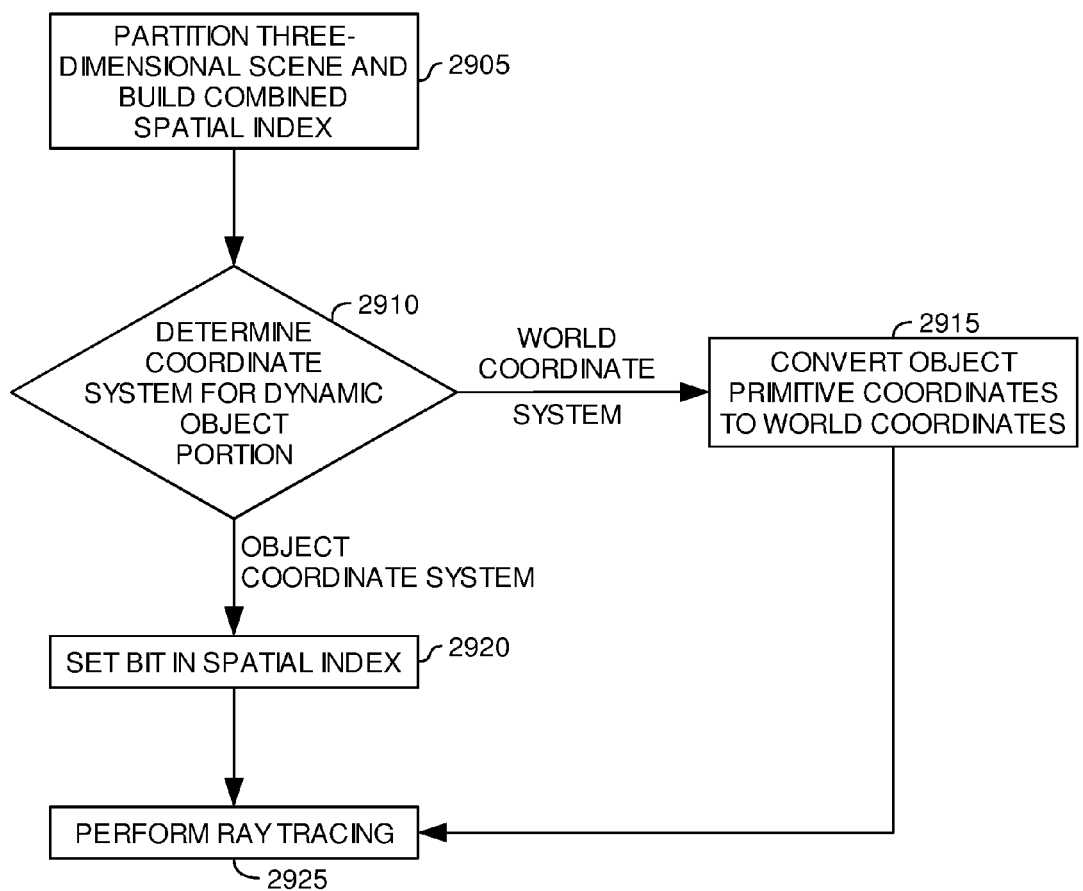
FIG. 29 is a flowchart illustrating an exemplary method of creating a combined spatial index which contains an object with an object coordinate system, according to embodiments of the invention.

FIG. 29 is a flowchart illustrating an exemplary method 2900 of creating a combined spatial index which contains an object with an object coordinate system, according to embodiments of the invention. The method may begin at step 2905 when a system responsible for creating the spatial index (e.g., the image processing system or the physics engine) constructs a spatial index by partitioning a three-dimensional scene. For example, the image processing system may construct the combined spatial index 2400 illustrated in FIG. 24 by partitioning the three-dimensional scene 2500 containing the dynamic bicycle object 1205 illustrated in FIG. 25.

Next, at step 2910, the image processing system may determine a coordinate system to use when performing ray tracing through the dynamic object portion of the spatial index. According to embodiments of the invention, the determination may be based on many factors and thresholds intended to select the most efficient technique to use when performing ray tracing through the dynamic object portion of the spatial index. For example, as described further below with respect to FIG. 30, the determination may be based on (but not limited to) a distance from a viewpoint to the origin of the object coordinate system, a distance from an origin of the world coordinate system to the origin of the object coordinate system, a rate of traversal of the dynamic object, a number of primitives which make up the dynamic object, a size of the dynamic object, an amount of memory available, and/or a number of ray-object intersections If, at step 2910, the image processing system determines to use the world coordinate system, the image processing system may proceed to step 2915 to convert the coordinates of primitives which make up the dynamic object from object coordinates into world coordinates. As described above, this may be accomplished using the amount of rotation the object is rotated with respect to the world coordinate system and the location of the origin of the object coordinate system in the world coordinate system. The image processing system may store the converted coordinates in the dynamic object portion of the spatial index. After converting the coordinates of primitives which make up the dynamic object to world coordinates, the image processing system may proceed to step 2925 where the image processing system may being to perform ray tracing for a frame.

However, if at step 2910, the image processing system determines to use the object coordinate system when performing ray tracing through the dynamic object portion of the spatial index, the image processing system may proceed to step 2920. At step 2920 the image processing system may set a bit in the spatial index which may indicate that the dynamic object portion of the spatial index contains information in the object coordinate system. This bit may be referred to as the coordinate system bit and may be stored within the spatial index. For example, the coordinate system bit may be stored within the node 1505 corresponding to the bounding volume surrounding the dynamic bicycle object 1205 (i.e., $BV_A$). Thus, when the image processing system is tracing a ray through the spatial index and the ray is traced to the dynamic object portion of the spatial index (e.g., traced to node 1505), the image processing system may be alerted (via a check of the coordinate system bit) that the trajectory of the ray must be converted into the object coordinate system in order to perform ray intersection tests. After setting the coordinate system bit at step 2920 the image processing system may proceed to step 2925 to begin performing ray tracing for a frame.

Figure 30:
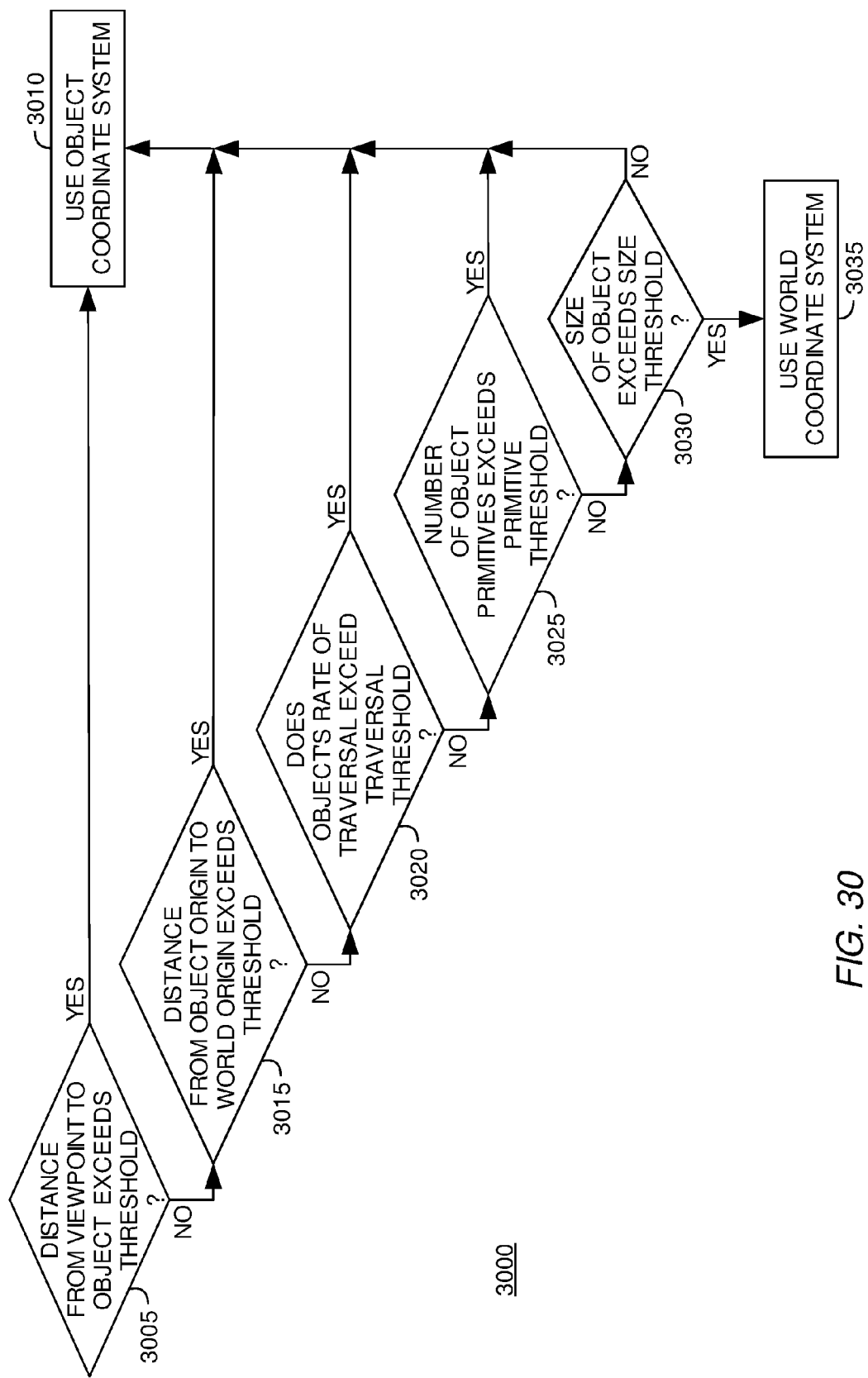
FIG. 30 is a flowchart which illustrates an exemplary method of determining which coordinate system to use when performing ray tracing through a dynamic object portion of a spatial index, according to one embodiment of the invention.

FIG. 30 is a flowchart which illustrates an exemplary method 3000 of determining which coordinate system to use when performing ray tracing through a dynamic object portion of a spatial index, according to one embodiment of the invention. The method beings at step 3005, for example, when step 2910 of method 2900 is executed.

At step 3005 a determination may be made whether a distance from a viewpoint to the dynamic object exceeds a threshold. The distance from the viewpoint to the dynamic object may be important in determining which coordinate system to use when tracing a ray thorough the dynamic object portion of the spatial index, because a dynamic object which is closer to the viewpoint may be intersected by more rays than an object which is further from the viewpoint. If the dynamic object is intersected by a large number of rays it may be more efficient to convert the points which define the object into the world coordinate system, because there may be fewer calculations to convert the entire object into the world coordinate system than to convert each ray which intersects the bounding volume which surrounds the dynamic object into the object coordinate system. In contrast, a dynamic object which is further from the viewpoint may be intersected by a smaller number of rays, and thus fewer ray-trajectory transformations may be necessary when performing ray tracing. If fewer ray trajectory coordinate transformations are needed than the number of calculations which are required to convert the dynamic object to the world coordinate system, it may be more efficient to leave the primitives which make up the object in the object coordinate system and convert the trajectory of rays which are traversed to the dynamic object portion of the combined spatial index into the object coordinate system.

The threshold distance from the viewpoint to the object may be selected as the distance where the workload (e.g., processing cycles) required to convert the trajectory of all of the rays which are likely to intersect the bounding volume which surrounds the dynamic object is the same as the workload required to convert the dynamic object into world coordinates. If the distance from the viewpoint to the dynamic object exceeds the threshold distance, the image processing system may proceed to step 3010 to select the object coordinate system. However, if the distance threshold is not exceeded, the image processing system may proceed to step 3015 to determine if other factors indicate that it may be more efficient to use the world coordinate system when rays are traversed through the dynamic object portion of the combined spatial index (i.e., convert the primitives which make up the object into world coordinates).

At step 3015, the image processing system may determine if a distance from the object origin to the world origin exceeds a threshold. The image processing system may take into consideration the distance from the object coordinate system origin to the world coordinate system origin because a transformation of primitive coordinates from the object coordinate system to the world coordinate system may result in a loss of accuracy when specifying the position of primitives which make up the dynamic object. If the threshold distance form the world origin to the object origin is exceeded, the image processing system may choose to maintain accuracy over improved efficiency and use the object coordinate system when performing ray intersection tests through the dynamic object portion of the spatial index. Consequently, the image processing system may proceed to step 3020 to select the object coordinate system. However, if the distance from the world coordinate system to the dynamic object coordinate system is not exceeded, the image processing system may proceed to step 3020 to determine if other factors indicate that it may be more efficient to use the world coordinate system when rays are traversed to the dynamic object portion of the combined spatial index (i.e., convert the primitives which make up the object into world coordinates).

At step 3020, the image processing system may determine if the object's rate of traversal exceeds a threshold. The rate of the object's movement may be important when determining whether to use the object coordinate system or the world coordinate system because if an object is moving relatively fast, converting the object primitives to the world coordinate system may only be effective for a relatively small period of time. That is, the primitive conversions may only be effective for the period of time the object remains in the same position and with the same rotation. Consequently, a relatively fast moving object may require more conversions from the object coordinate system to the world coordinate system. In contrast, a relatively slow moving object may require fewer conversions into the world coordinate system over the same period of frames. If the object requires a relatively large number of conversions, it may be inefficient to frequently convert the object primitives into the world coordinate system in contrast to converting the trajectory of rays which are traversed through the dynamic object portion of the spatial index.

The rate of traversal threshold may be set such that if the rate of the object traversal exceeds the threshold, the processing workload (e.g., processing cycles) required to convert the object to the world coordinate system over a period of time outweighs the processing workload saved by not having to convert the rays which are traversed to the dynamic object portion of the spatial index over the same period of time. If the rate of dynamic-object traversal does exceed the threshold, the image processing system may proceed to step 3010 to select the object coordinate system. However, if the object rate of traversal does not exceed the threshold, the image processing system may proceed to step 3025 to determine if other factors indicate that it may be more efficient to use the world coordinate system when rays are traversed through the dynamic object portion of the combined spatial index.

At step 3025 the image processing system may determine if the number of primitives which make up the dynamic object exceeds a threshold. The number of primitives which makeup the dynamic object may be an important consideration when determining which coordinate system to use because the number of primitives may be directly related to the amount of processing workload required to convert the dynamic object primitives into the world coordinate system. If the dynamic object has a relatively large number of primitives which may have to be converted form the object's coordinate system to the world coordinate system, the image processing system may have to perform a large number of conversions to convert the object into the world coordinate system. The large number of conversions may require a large amount of processing power and, consequently, may be inefficient in comparison to converting ray trajectories into the world coordinate system. Thus, if an object has a large number of primitives (large enough to exceed the threshold), the image processing system may proceed to step 3010 to select the object coordinate system. However, if the object has a relatively small number of primitives (small enough to not exceed the threshold), converting the object primitives from the object coordinate system to the world coordinate system may be more efficient than converting each ray which is traversed to the dynamic object portion of the spatial index into the object coordinate system. Therefore, if the object has fewer primitives than the threshold, the image processing system may proceed to step 3030.

The threshold number of primitives may be selected such that the workload required to convert the threshold number of primitives to the world coordinate system equals the workload required to convert the number of rays which are likely to intersect an object with the threshold number of primitives.

At step 3030 the image processing system may determine if the size of the object exceeds a size threshold. The size of the dynamic object may be an important consideration when determining which coordinate system to use because the size of the object may have a direct correlation with the number of rays which are likely to intersect the object and, thus, may have to be converted into the object coordinate system if the image processing system maintains the primitive coordinates in the object coordinate system. If the object is relatively large, such that a relatively large number of rays are likely to intersect the object it may be more efficient to convert the object primitives into the world coordinate system. However, if the size of the object is relatively small, it may be more efficient to keep the object primitives in the object coordinate system and only convert rays which are traversed through the dynamic object portion of the spatial index into the object coordinate system.

The size threshold may be set such that the processor workload required to convert the trajectory of rays which are likely to intersect an object of the threshold size and are traversed to the dynamic object portion of the spatial index is equal to the processing workload required to convert the primitives of the dynamic object into the world coordinates. If the size threshold is exceeded, the image processing system may proceed to step 3035 to select the world coordinates system. However, if the size threshold is not exceeded, the image processing system may proceed to step 3010 to select the object coordinate system.

Although the factors of available memory and a number of ray-object intersections are not illustrated as determinations steps in the flowchart of FIG. 30, embodiments of the invention may determine whether to use the object coordinate system or the world coordinate system based on the amount of available memory and the number of ray-object intersections.

Furthermore, although the examples above are illustrated in the flowchart of FIG. 30 as requiring multiple determinations or object attributes to select the world coordinate system to use when performing ray tracing through the dynamic object portion of the spatial index, embodiments of the invention may only require one object attribute or determination to select the world coordinate system to use when performing ray tracing through the dynamic object portion of the spatial index. In addition, the determination of whether to use the object coordinate system or the world coordinate system may be determined based on the fewer factors than illustrated in the flowchart in FIG. 30. For example, the determination to use the object coordinate system or the world coordinate system may be based on a single factor (e.g., distance of the object from the viewpoint) in contrast to multiple factors.

Conclusion

By assessing various attributes or factors associated with a dynamic object, an image processing system may determine the most efficient coordinate system to use when traversing rays through the portion of a spatial index corresponding to the dynamic object. The image processing system may take into consideration a number of factors including, but not limited to, a distance form a viewpoint to the dynamic object, a distance from the origin of the world coordinate system to the object coordinate system, a rate of traversal of the dynamic object, and a number of primitives which make up the object. These factors alone or together may indicate whether it is more efficient to perform ray intersection tests in an object coordinate system or in a world coordinate system. If the image processing system determines the world coordinate system may be more efficient for performing ray intersection tests when tracing rays through the dynamic object portion of the spatial index, according to embodiments of the invention, the image processing system may convert the object primitives into world coordinates and store the converted primitives in the spatial index. However, if the image processing system determines that it would be more efficient to use the object coordinate system when performing ray tracing through the dynamic portion of the spatial index, according to embodiments of the invention, the image processing system may set a bit in the dynamic object portion of the spatial index to indicate the coordinate system of the object differs from the world coordinate system.

While the foregoing is directed to embodiments of the present invention, other and further embodiments of the invention may be devised without departing from the basic scope thereof, and the scope thereof is determined by the claims that follow.

What is claimed is:

1. A method of performing ray tracing image processing using a computer system for a three-dimensional scene, comprising:
   providing a spatial index having a first portion and a second portion and having at least one branch from a node in the first portion to a node in the second portion, wherein nodes in the first portion correspond to bounding volumes which partition the three -dimensional scene with respect to a first coordinate system, and wherein nodes in the second portion correspond to bounding volumes which partition the three-dimensional scene with respect to a second coordinate system;
   issuing a ray into the three-dimensional scene;
   tracing the ray through the three-dimensional scene by taking branches to nodes corresponding to bounding volumes intersected by the ray until the at least one branch from a node in the first portion to a node in the second portion is reached; and
   selecting a coordinate system to use when tracing the ray through the portion of the spatial index which partitions the three-dimensional scene with respect to the second coordinate system.

2. The method of claim 1, wherein the second coordinate system partitions a portion of the three-dimensional scene containing a dynamic object. pg,59

3. The method of claim 1, wherein selecting a coordinate system comprises checking a bit stored in a node of the spatial index.

4. The method of claim 1, further comprising:
   selecting the first coordinate system; and
   tracing the ray through the portion of the spatial index which partitions the three -dimensional scene with respect to the second coordinate system by performing ray-bounding volume intersection tests with coordinates in the first coordinate system.

5. The method of claim 1, further comprising:
   selecting the second coordinate system;
   converting the trajectory of the ray into a trajectory expressed in the second coordinate system; and
   tracing the ray through the portion of the spatial index which partitions the three-dimensional scene with respect to the second coordinate system by performing ray-bounding volume intersection tests with coordinates in the second coordinate system.

* * * * *